United States Patent
Maus et al.

(10) Patent No.: US 12,459,975 B2
(45) Date of Patent: Nov. 4, 2025

(54) MODIFIED T CELLS AND METHODS OF THEIR USE

(71) Applicant: The General Hospital Corporation, Boston, MA (US)

(72) Inventors: Marcela V. Maus, Lexington, MA (US); Matthew Frigault, Somerville, MA (US); Mark Cobbold, Winchester, MA (US)

(73) Assignee: The General Hospital Corporation, Boston, MA (US)

( * ) Notice: Subject to any disclaimer, the term of this patent is extended or adjusted under 35 U.S.C. 154(b) by 744 days.

(21) Appl. No.: 16/476,628

(22) PCT Filed: Jan. 10, 2018

(86) PCT No.: PCT/US2018/013177
§ 371 (c)(1),
(2) Date: Jul. 9, 2019

(87) PCT Pub. No.: WO2018/132479
PCT Pub. Date: Jul. 19, 2018

(65) Prior Publication Data
US 2021/0137978 A1  May 13, 2021

Related U.S. Application Data

(60) Provisional application No. 62/529,130, filed on Jul. 6, 2017, provisional application No. 62/519,960, filed (Continued)

(51) Int. Cl.
C07K 14/005 (2006.01)
A61K 40/11 (2025.01)
(Continued)

(52) U.S. Cl.
CPC ............ *C07K 14/005* (2013.01); *A61K 40/11* (2025.01); *A61K 40/31* (2025.01);
(Continued)

(58) Field of Classification Search
CPC .............. C07K 14/005; C07K 14/7051; C07K 2319/03; A61K 40/11; A61K 40/31;
(Continued)

(56) References Cited

U.S. PATENT DOCUMENTS

2003/0118568 A1  6/2003  Crew
2012/0321667 A1  12/2012  Sentman
(Continued)

FOREIGN PATENT DOCUMENTS

JP  2005-535619 A  11/2005
JP  2012-504417 A   2/2012
(Continued)

OTHER PUBLICATIONS

Wang et al. 2016; PNAS; pp. 2868-2873; Efficient delivery of genome-editing proteins using bioreducible lipid nanoparticles.*
(Continued)

*Primary Examiner* — Tracy Vivlemore
*Assistant Examiner* — Thomas R. Amick
(74) *Attorney, Agent, or Firm* — Clark & Elbing LLP

(57) ABSTRACT

The invention provides modified an isolated T lymphocytes having reduced or eliminated expression of the T Cell Receptor, due to reduced or eliminated expression of a CD3ζ, T Cell Receptor Alpha Chain, or T Cell Receptor Beta Chain gene relative to a T lymphocyte without modification, where the isolated T lymphocyte expresses a protein comprising US6, UL40 viral protein and signal peptide, and UL18.

17 Claims, 14 Drawing Sheets

Specification includes a Sequence Listing.

CRISPR knock out of CD3zeta and TRAC ablates expression of the CD3/T cell receptor complex in Jurkat T cells.

Related U.S. Application Data on Jun. 15, 2017, provisional application No. 62/444,590, filed on Jan. 10, 2017, provisional application No. 62/444,616, filed on Jan. 10, 2017.

(51) Int. Cl.

| | |
|---|---|
| *A61K 40/31* | (2025.01) |
| *A61K 40/42* | (2025.01) |
| *A61K 40/46* | (2025.01) |
| *A61K 40/50* | (2025.01) |
| *C12N 5/0783* | (2010.01) |

(52) U.S. Cl.
CPC .......... *A61K 40/4211* (2025.01); *A61K 40/46* (2025.01); *C12N 5/0636* (2013.01); *A61K 40/50* (2025.01); *C12N 2510/00* (2013.01); *C12N 2710/16122* (2013.01)

(58) Field of Classification Search
CPC .... A61K 40/4211; A61K 40/46; A61K 40/50; C12N 5/0636; C12N 2510/00; C12N 2710/16122; C12N 2501/515
See application file for complete search history.

(56) References Cited

U.S. PATENT DOCUMENTS

| | | | |
|---|---|---|---|
| 2013/0156808 A1* | 6/2013 | Jonjic | A61K 39/4611 435/320.1 |
| 2014/0349402 A1* | 11/2014 | Cooper | A61K 39/001119 435/455 |
| 2015/0158927 A1 | 6/2015 | Hantash | |
| 2016/0208216 A1 | 7/2016 | Vera et al. | |

FOREIGN PATENT DOCUMENTS

| | | |
|---|---|---|
| WO | WO-2011/059836 A2 | 5/2011 |
| WO | WO-2013/176915 A1 | 11/2013 |
| WO | WO-2015/136001 A1 | 9/2015 |
| WO | WO-2016/069282 A1 | 5/2016 |

OTHER PUBLICATIONS

Deshayes et al., 2005; CMLS, Cell. Mol. Life Sci. pp. 1839-1849; Cell-penetrating peptides: tools for intracellular delivery of therapeutics.*

Marsden et al., Chem. Soc. Rev., 2011, pp. 1572-1585; Model systems for membrane fusion.*

International Search Report and Written Opinion for International Application No. PCT/US18/13177, mailed May 16, 2018 (18 pages).

International Preliminary Report on Patentability for International Application No. PCT/US2018/013177 issued Jul. 16, 2019 (9 pages).

Paszkiewicz et al., "Targeted antibody-mediated depletion of murine CD19 CAR T cells permanently reverses B cell aplasia," J Clin Invest. 126(11):4262-72 (2016).

Wilkinson et al., "Modulation of natural killer cells by human cytomegalovirus," J Clin Virol. 41(3):206-12 (Mar. 2008).

Grimshaw, Benjamin David, Thesis: "Developing a universal T cell for use in adoptive immunotherapy," Doctor of Philosophy, University College London, 2015 (267 pages).

* cited by examiner

CRISPR knock out of CD3zeta and TRAC ablates expression of the CD3/T cell receptor complex in Jurkat T cells.

T7E1 Disruption Assay Using SpCas9 and Various gRNA

Maximal Disruption with gRNA [2] – Guide 2

The sequence of that target site is:
ACAGTTGCCGATTACACAGGTAGGG (PAM underlined)
(SEQ ID NO: 13)

Where the guide sequence was
GCAGTTGCCGATTACACAGGTA (where the 5' base was substituted from A>G for improved KO)
(SEQ ID NO: 14)

MODIFIED T CELLS AND METHODS OF THEIR USE

SEQUENCE LISTING

The instant application contains a Sequence Listing which has been submitted electronically in ASCII format and is hereby incorporated by reference in its entirety. Said ASCII copy, created May 13, 2025, is named 51295-005003_Sequence_Listing_5_13_25_ST25 and is 21,177 bytes in size.

TECHNICAL FIELD

The technology described herein relates to modified T cells and their use in immunotherapeutic methods.

BACKGROUND

Adoptive T cell therapy involves the administration of antigen-specific T cells to treat diseases including cancer, infectious disease, and autoimmune disease. T cells used in this therapy can be isolated from subjects and selected for a desired, pre-existing specificity. As one example, tumor infiltrating T lymphocytes can be isolated from a subject, expanded ex vivo, and then administered to treat cancer in the subject. In other approaches, T cells can be modified ex vivo to have a new specificity. In one example of such an approach, T cells are genetically modified ex vivo to express chimeric antigen receptors (CARs). CARs provide a way to direct a cytotoxic T cell response to target cells expressing a selected target antigen, most often a tumor antigen or a tumor-associated antigen. CARs are an adaptation of the T cell receptor, where the antigen binding domain is replaced with the antigen binding domain of an antibody that specifically binds the target antigen. Engagement of the target antigen on the surface of a target cell by a CAR expressed on a T cell ("CAR T cell" or "CAR-T") promotes killing of the target cell. In another example, T cells are genetically modified ex vivo to express a new T cell receptor.

Current approaches to adoptive T cell therapy generally employ autologous cells, i.e., cells which are obtained from the subject to whom they are later to be administered. This approach can be beneficial with respect to minimizing the likelihood of rejection of the administered cells by the recipient. However, drawbacks of this approach include the need for specialized personnel and facilities, as well as complexities associated with obtaining cells from a patient who may be quite ill, and then needing to have the patient wait for processing of the cells. In view of these challenges, it would be desirable to use allogeneic cells, obtained from genetically non-identical donors of the same species as the recipients, in adoptive T cell therapy. This would permit the generation, storage, and validation of "universal" T cells for use when needed. This approach, however, presents its own challenges, due to immune reactions of recipients against donated cells, which may lead to issues including low persistence of the cells, host-versus-graft effects in immunocompetent subjects, and graft-versus-host effects in immunocompromised subjects.

There is a need for new approaches to overcome the challenges posed by existing methods for adoptive T cell therapy, such as those noted above.

SUMMARY

In one aspect, the invention provides isolated T lymphocytes modified to have reduced or eliminated expression of the T Cell Receptor (TCR) due to, e.g., reduced or eliminated expression of a CD3ζ, T Cell Receptor Alpha Chain (TRAC), and/or T Cell Receptor Beta Chain (TRBC) gene.

In one embodiment, the isolated T lymphocyte includes a genome in which a CD3ζ, TRAC, and/or TRBC gene, regulatory sequence, coding sequence, exon, or a portion thereof, is mutated (e.g., includes a deletion, such as a frameshift mutation), resulting in reduced, null, or non-functional CD3ζ, CD3eta, CD3theta, TRAC, and/or TRBC expression.

In one embodiment, the mutation disrupts assembly of the T cell receptor or CD3ζ signaling.

In one embodiment, the isolated T lymphocytes have a genome in which a CD3ζ, TRAC, and/or TRBC gene is deleted.

In one embodiment, the isolated T lymphocytes have a genome in which two alleles of a CD3ζ, TRAC, and/or TRBC gene are deleted.

In one embodiment, the reduced expression of the CD3ζ, TRAC, and/or TRBC gene is null expression.

In one embodiment, the isolated T lymphocytes further have reduced expression of CD3 eta or CD3 theta.

In one embodiment, the isolated T lymphocytes further have a deletion or mutation of an HLA locus (e.g., the HLA locus on chromosome 6, e.g., in humans), or a portion thereof.

In one embodiment, the isolated T lymphocytes further have decreased HLA Class I expression.

In one embodiment, the isolated T lymphocytes are further modified to express HLA-G.

In one embodiment, the isolated T lymphocytes further include a gene encoding a heterologous protein that facilitates the T lymphocyte in evading immune attack (e.g., T cell or NK mediated rejection) from a host to whom the T lymphocyte is administered.

In one embodiment, the heterologous protein is a viral protein from, e.g., a virus selected from the group consisting of cytomegalovirus (CMV), Epstein Barr virus (EBV), herpes simplex virus (HSV), and bovine herpes virus-1 (BoHV-1).

In one embodiment, the viral protein is from CMV and is selected from the group consisting of US6, UL40, and UL18.

In one embodiment, the viral protein inhibits transporter associated with antigen processing (TAP) and, optionally, is selected from the group consisting of CMV US6, HSV ICP47, BoHV-1 UL49.5, and EBV BNLF2a.

In one embodiment, the isolated T lymphocytes further include a gene encoding a reporter gene, e.g., a reporter gene including a truncated epidermal growth factor receptor (EGFR) gene, truncated prostate-specific membrane antigen (PSMA), truncated low affinity nerve growth factor receptor (LNGFR), truncated CD19.

In one embodiment, the isolated T lymphocytes further include a gene encoding a therapeutic protein (e.g., an antigen receptor, which optionally confers specificity to a select target antigen or ligand).

In one embodiment, the antigen receptor is a chimeric antigen receptor (CAR), which optionally includes an extracellular domain, a transmembrane region domain, and an intracellular region domain.

In one embodiment, the extracellular domain includes a single chain antibody and, optionally, the intracellular domain comprises a T cell activating domain.

In one embodiment, the isolated T lymphocytes further include a gene that induces cell death, e.g., a gene that is an activatable suicide gene (e.g., a suicide gene that is activated by a drug).

In one embodiment, the suicide gene expresses an FK506 binding domain fused to a caspase9 pro-apoptotic molecule.

In another aspect, the invention provides methods for producing a modified T lymphocyte (e.g., a T lymphocyte lacking or having reduced expression of a functional TCR, the method including inactivating a CD3ζ, TRAC, and/or TRBC gene in a T lymphocyte.

In one embodiment, the inactivation of the CD3ζ, TRAC, and/or TRBC gene is carried out using a nuclease or system selected from the group of zinc finger nucleases (ZFNs), transcription activator-like effector nucleases (TALENs), and the clustered regularly interspaced short palindromic repeats (CRISPR/cas9 system).

In one embodiment, the modified T lymphocyte is a modified T lymphocyte as described in any of the embodiments listed above.

In another aspect, the invention provides methods of treating a subject for a disease, the methods including administering to the subject an isolated T lymphocyte of any one or more of the embodiments listed above.

In one embodiment, the disease is selected from the group consisting of cancer, an infectious disease, and an indication resulting from a transplantation procedure.

In another aspect, the invention provides methods of reducing an immunogenic reaction in a subject, the methods including administering to a subject a T lymphocyte according to any one or more of the embodiments listed above.

In one embodiment, the T lymphocyte expresses a transgene.

In one embodiment, the T lymphocyte has reduced competition with endogenous T cell receptor signaling molecules.

In one embodiment, the T lymphocyte is autologous with respect to the subject.

In one embodiment, the T lymphocyte is allogeneic with respect to the subject.

In one embodiment, the modified T lymphocytes are expanded in vivo.

In one embodiment, the modified T lymphocytes are expanded in the subject's blood.

In one embodiment, the modified T lymphocytes are expanded in vitro, prior to administration.

In another aspect, the invention provides vectors including a gene encoding a therapeutic protein and a heterologous protein that facilitates immune system evasion.

In one aspect, the heterologous protein is a viral protein from, e.g., a virus selected from the group consisting of cytomegalovirus (CMV), Epstein Barr virus (EBV), herpes simplex virus (HSV), and bovine herpes virus-1 (BoHV-1).

In one embodiment, the viral protein is from CMV and is selected from the group consisting of US6, UL40, and UL18.

In one embodiment, the viral protein inhibits transporter associated with antigen processing (TAP) and, e.g., is selected from the group consisting of CMV US6, HSV ICP47, BoHV-1 UL49.5, and EBV BNLF2a.

In one embodiment, the therapeutic protein is a CAR.

In another aspect, the invention provides methods of transducing T lymphocytes with one or more of the vectors of claims of one or more of the embodiments set forth above.

In another aspect, the invention provides modified T lymphocytes or cell lines made according to the methods of any one of the embodiments set forth above, or a subculture thereof.

In another aspect, the invention provides pharmaceutical compositions including at least one modified T lymphocyte of any one or more of the embodiments set forth above.

In another aspect, the invention provides methods of treating a subject including the steps of (a) preparing a population of modified T lymphocytes according to the method of any one or more of the embodiments set forth above, and (b) administering the modified T lymphocytes to the subject.

In one embodiment, the T lymphocytes originate from the subject to be treated.

In one embodiment, the T lymphocytes originate from a healthy donor.

The invention also includes use of the modified T lymphocytes described herein in methods including, e.g., the methods described herein (e.g., therapeutic methods), as well as use of the modified T lymphocytes for the preparation of medicaments for use in, e.g., the methods described herein.

The various embodiments listed above can be combined with one another, in any combination, as determined to be appropriate by those of skill in the art.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed technology, because the scope of the technology is limited only by the claims. Unless otherwise defined, all technical and scientific terms used herein have the same meaning as commonly understood by one of ordinary skill in the art to which this technology belongs. If there is an apparent discrepancy between the usage of a term in the art and its definition provided herein, the definition provided within the specification shall prevail.

Definitions of common terms in immunology and molecular biology can be found in The Merck Manual of Diagnosis and Therapy, 19$^{th}$ Edition, published by Merck Sharp & Dohme Corp., 2011 (ISBN 978-0-911910-19-3); Robert S. Porter et al. (eds.), The Encyclopedia of Molecular Cell Biology and Molecular Medicine, published by Blackwell Science Ltd., 1999-2012 (ISBN 9783527600908); and Robert A. Meyers (ed.), Molecular Biology and Biotechnology: a Comprehensive Desk Reference, published by VCH Publishers, Inc., 1995 (ISBN 1-56081-569-8); Immunology by Werner Luttmann, published by Elsevier, 2006; Janeway's Immunobiology, Kenneth Murphy, Allan Mowat, Casey Weaver (eds.), Taylor & Francis Limited, 2014 (ISBN 0815345305, 9780815345305); Lewin's Genes XI, published by Jones & Bartlett Publishers, 2014 (ISBN-1449659055); Michael Richard Green and Joseph Sambrook, Molecular Cloning: A Laboratory Manual, 4th ed., Cold Spring Harbor Laboratory Press, Cold Spring Harbor, N.Y., USA (2012) (ISBN 1936113414); Davis et al., Basic Methods in Molecular Biology, Elsevier Science Publishing, Inc., New York, USA (2012) (ISBN 044460149X); Laboratory Methods in Enzymology: DNA, Jon Lorsch (ed.) Elsevier, 2013 (ISBN 0124199542); Current Protocols in Molecular Biology (CPMB), Frederick M. Ausubel (ed.), John Wiley and Sons, 2014 (ISBN 047150338X, 9780471503385), Current Protocols in Protein Science (CPPS), John E. Coligan (ed.), John Wiley and Sons, Inc., 2005; and Current Protocols in Immunology (CPI) (John E. Coligan, ADA M Kruisbeek, David H Margulies, Ethan M Shevach, Warren Strobe, (eds.) John Wiley and Sons, Inc., 2003 (ISBN 0471142735, 9780471142737), the contents of which are all incorporated by reference herein in their entireties.

The terms "decrease," "reduced," "reduction," or "inhibit" are all used herein to mean a decrease by a statistically significant amount. In some embodiments, "reduce," "reduction" or "decrease" or "inhibit" typically means a decrease by at least 10% as compared to a reference level (e.g., the absence of a given treatment, agent, mutation, or deletion) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. Where applicable, a decrease can be preferably down to a level accepted as within the range of normal for an individual without a given disorder.

The terms "increased," "increase," "enhance," or "activate" are all used herein to mean an increase by a statistically significant amount. In some embodiments, the terms "increased," "increase," "enhance," or "activate" can mean an increase of at least 10% as compared to a reference level, for example, an increase of at least about 20%, or at least about 30%, or at least about 40%, or at least about 50%, or at least about 60%, or at least about 70%, or at least about 80%, or at least about 90% or up to and including a 100% increase, or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, an "increase" is a statistically significant increase in such level.

As used herein, a "subject" means a human or animal. Usually the animal is a vertebrate such as a primate, rodent, domestic animal, or game animal. Primates include, for example, chimpanzees, cynomologous monkeys, spider monkeys, and macaques, e.g., Rhesus. Rodents include, for example, mice, rats, woodchucks, ferrets, rabbits and hamsters. Domestic and game animals include, for example, cows, horses, pigs, deer, bison, buffalo, feline species, e.g., domestic cat, canine species, e.g., dog, fox, wolf, avian species, e.g., chicken, emu, ostrich, and fish, e.g., trout, catfish and salmon. In some embodiments, the subject is a mammal, e.g., a primate, e.g., a human. The terms, "individual," "patient," and "subject" are used interchangeably herein.

Preferably, the subject is a mammal. The mammal can be a human, non-human primate, mouse, rat, dog, cat, horse, or cow, but is not limited to these examples. Mammals other than humans can be advantageously used as subjects that represent animal models of disease, e.g., cancer. A subject can be male or female, and can be a child or an adult.

A subject can be one who has been previously diagnosed with or identified as suffering from or having a condition in need of treatment (e.g., leukemia or another type of cancer, among others, e.g., an infectious disease, an autoimmune disease, or an effect of transplantation) or one or more complications related to such a condition and, optionally, have already undergone treatment for the condition or the one or more complications related to the condition. Alternatively, a subject can also be one who has not been previously diagnosed as having such condition or related complications. For example, a subject can be one who exhibits one or more risk factors for the condition or one or more complications related to the condition or a subject who does not exhibit risk factors.

A "subject in need" of treatment for a particular condition can be a subject having that condition, diagnosed as having that condition, or at risk of developing that condition.

A "disease" is a state of health of an animal, for example, a human, wherein the animal cannot maintain homeostasis, and wherein if the disease is not ameliorated, then the animal's health continues to deteriorate. In contrast, a "disorder" in an animal is a state of health in which the animal is able to maintain homeostasis, but in which the animal's state of health is less favorable than it would be in the absence of the disorder. Left untreated, a disorder does not necessarily cause a further decrease in the animal's state of health.

As used herein, the terms "tumor antigen" and "cancer antigen" are used interchangeably to refer to antigens that are differentially expressed by cancer cells and can thereby be exploited in order to target cancer cells. Cancer antigens are antigens which can potentially stimulate apparently tumor-specific immune responses. Some of these antigens are encoded, although not necessarily expressed, by normal cells. These antigens can be characterized as those which are normally silent (i.e., not expressed) in normal cells, those that are expressed only at certain stages of differentiation, and those that are temporally expressed such as embryonic and fetal antigens. Other cancer antigens are encoded by mutant cellular genes, such as oncogenes (e.g., activated ras oncogene), suppressor genes (e.g., mutant p53), and fusion proteins resulting from internal deletions or chromosomal translocations. Still other cancer antigens can be encoded by viral genes such as those carried on RNA and DNA tumor viruses. Many tumor antigens have been defined in terms of multiple solid tumors: MAGE 1, 2, & 3, defined by immunity; MART-1/Melan-A, gp100, carcinoembryonic antigen (CEA), HER2, mucins (i.e., MUC-1), prostate-specific antigen (PSA), and prostatic acid phosphatase (PAP). In addition, viral proteins such as some encoded by hepatitis B (HBV), Epstein-Barr (EBV), and human papilloma (HPV) have been shown to be important in the development of hepatocellular carcinoma, lymphoma, and cervical cancer, respectively.

As used herein, the term "chimeric" refers to the product of the fusion of portions of at least two or more different polynucleotide molecules. In one embodiment, the term "chimeric" refers to a gene expression element produced through the manipulation of known elements or other polynucleotide molecules In some embodiments, "activation" can refer to the state of a T cell that has been sufficiently stimulated to induce detectable cellular proliferation. In some embodiments activation can refer to induced cytokine production. In other embodiments, activation can refer to detectable effector functions. At a minimum, an "activated T cell" as used herein is a proliferative T cell.

As used herein, the terms "specific binding" and "specifically binds" refer to a physical interaction between two molecules, compounds, cells, and/or particles wherein the first entity binds to the second, target, entity with greater specificity and affinity than it binds to a third entity which is a non-target. In some embodiments, specific binding can refer to an affinity of the first entity for the second target, entity, which is at least 10 times, at least 50 times, at least 100 times, at least 500 times, at least 1000 times, or more greater than the affinity for the third non-target entity under the same conditions. A reagent specific for a given target is one that exhibits specific binding for that target under the conditions of the assay being utilized. A non-limiting example includes an antibody, or a ligand, which recognizes and binds with a cognate binding partner (for example, a stimulatory and/or costimulatory molecule present on a T cell) protein.

A "stimulatory ligand," as used herein, refers to a ligand that when present on an antigen presenting cell (APC, e.g., a macrophage, a dendritic cell, a B-cell, an artificial APC, and the like) can specifically bind with a cognate binding partner (referred to herein as a "stimulatory molecule" or "co-stimulatory molecule") on a T cell, thereby mediating a primary response by the T cell, including, but not limited to, proliferation, activation, initiation of an immune response, and the like. Stimulatory ligands are well-known in the art and encompass, inter alia, an MHC Class I molecule loaded with a peptide, an anti-CD3 antibody, a superagonist anti-CD28 antibody, and a superagonist anti-CD2 antibody.

A "stimulatory molecule," as the term is used herein, means a molecule on a T cell that specifically binds with a cognate stimulatory ligand present on an antigen presenting cell.

"Co-stimulatory ligand," as the term is used herein, includes a molecule on an APC that specifically binds a cognate co-stimulatory molecule on a T cell, thereby providing a signal which, in addition to the primary signal provided by, for instance, binding of a TCR/CD3 complex with an MHC molecule loaded with peptide, mediates a T cell response, including, but not limited to, proliferation, activation, differentiation, and the like. A co-stimulatory ligand can include, but is not limited to, 4-1BBL, OX40L, CD7, B7-1 (CD80), B7-2 (CD86), PD-L1, PD-L2, inducible COStimulatory ligand (ICOS-L), intercellular adhesion molecule (ICAM), CD30L, CD40, CD70, CD83, HLA-G, MICA, MICB, HVEM, lymphotoxin beta receptor, 3/TR6, ILT3, ILT4, HVEM, an agonist or antibody that binds Toll-like receptor and a ligand that specifically binds with B7-H3. A co-stimulatory ligand also can include, but is not limited to, an antibody that specifically binds with a co-stimulatory molecule present on a T cell, such as, but not limited to, CD27, CD28, 4-1BB, OX40, CD30, CD40, PD-1, ICOS, lymphocyte function-associated antigen-1 (LFA-1), CD2, CD7, LIGHT, NKG2C, B7-H3, and a ligand that specifically binds with CD83.

A "co-stimulatory molecule" refers to the cognate binding partner on a T cell that specifically binds with a co-stimulatory ligand, thereby mediating a co-stimulatory response by the T cell, such as, but not limited to, proliferation. Co-stimulatory molecules include, but are not limited to an MHC class I molecule, BTLA, a Toll-like receptor, CD27, CD28, 4-1BB, OX40, CD30, CD40, PD-1, ICOS, lymphocyte function-associated antigen-1 (LFA-1), CD2, CD7, LIGHT, NKG2C, B7-H3, and CD83.

In one embodiment, the terms "modified" or "engineered" and their grammatical equivalents as used herein can refer to one or more human-designed alterations of a nucleic acid, e.g., the nucleic acid within an organism's genome. In another embodiment, engineered can refer to alterations, additions, and/or deletion of genes. A "modified cell" or an "engineered cell" can refer to a cell with an added, deleted and/or altered gene. The term "cell," "modified cell," or "engineered cell" and their grammatical equivalents as used herein can refer to a cell of human or non-human animal origin.

As used herein, the term "operably linked" refers to a first polynucleotide molecule, such as a promoter, connected with a second transcribable polynucleotide molecule, such as a gene of interest, where the polynucleotide molecules are so arranged that the first polynucleotide molecule affects the function of the second polynucleotide molecule. The two polynucleotide molecules may or may not be part of a single contiguous polynucleotide molecule and may or may not be adjacent. For example, a promoter is operably linked to a gene of interest if the promoter regulates or mediates transcription of the gene of interest in a cell.

In the various embodiments described herein, it is further contemplated that variants (naturally occurring or otherwise), alleles, homologs, conservatively modified variants, and/or conservative substitution variants of any of the particular polypeptides described are encompassed. As to amino acid sequences, one of ordinary skill will recognize that individual substitutions, deletions, or additions to a nucleic acid, peptide, polypeptide, or protein sequence which alters a single amino acid or a small percentage of amino acids in the encoded sequence is a "conservatively modified variant" where the alteration results in the substitution of an amino acid with a chemically similar amino acid and retains the desired activity of the polypeptide. Such conservatively modified variants are in addition to and do not exclude polymorphic variants, interspecies homologs, and alleles consistent with the disclosure.

A given amino acid can be replaced by a residue having similar physiochemical characteristics, e.g., substituting one aliphatic residue for another (such as Ile, Val, Leu, or Ala for one another), or substitution of one polar residue for another (such as between Lys and Arg; Glu and Asp; or Gln and Asn). Other such conservative substitutions, e.g., substitutions of entire regions having similar hydrophobicity characteristics, are well known. Polypeptides comprising conservative amino acid substitutions can be tested in any one of the assays described herein to confirm that a desired activity, e.g., ligand-mediated receptor activity and specificity of a native or reference polypeptide is retained.

Amino acids can be grouped according to similarities in the properties of their side chains (in A. L. Lehninger, in Biochemistry, second ed., pp. 73-75, Worth Publishers, New York (1975)): (1) non-polar: Ala (A), Val (V), Leu (L), Ile (I), Pro (P), Phe (F), Trp (W), Met (M); (2) uncharged polar: Gly (G), Ser(S), Thr (T), Cys (C), Tyr (Y), Asn (N), Gln (Q); (3) acidic: Asp (D), Glu (E); (4) basic: Lys (K), Arg (R), His (H). Alternatively, naturally occurring residues can be divided into groups based on common side-chain properties: (1) hydrophobic: Norleucine, Met, Ala, Val, Leu, Ile; (2) neutral hydrophilic: Cys, Ser, Thr, Asn, Gln; (3) acidic: Asp, Glu; (4) basic: His, Lys, Arg; (5) residues that influence chain orientation: Gly, Pro; (6) aromatic: Trp, Tyr, Phe. Non-conservative substitutions will entail exchanging a member of one of these classes for another class. Particular conservative substitutions include, for example; Ala into Gly or into Ser; Arg into Lys; Asn into Gln or into His; Asp into Glu; Cys into Ser; Gln into Asn; Glu into Asp; Gly into Ala or into Pro; His into Asn or into Gln; Ile into Leu or into Val; Leu into Ile or into Val; Lys into Arg, into Gln or into Glu; Met into Leu, into Tyr or into Ile; Phe into Met, into Leu or into Tyr; Ser into Thr; Thr into Ser; Trp into Tyr; Tyr into Trp; and/or Phe into Val, into Ile or into Leu.

In some embodiments, a polypeptide described herein (or a nucleic acid encoding such a polypeptide) can be a functional fragment of one of the amino acid sequences described herein. As used herein, a "functional fragment" is a fragment or segment of a peptide which retains at least 50% of the wildtype reference polypeptide's activity according to an assay known in the art or described below herein. A functional fragment can comprise conservative substitutions of the sequences disclosed herein.

In some embodiments, a polypeptide described herein can be a variant of a polypeptide or molecule as described herein. In some embodiments, the variant is a conservatively modified variant. Conservative substitution variants can be obtained by mutations of native nucleotide sequences, for example. A "variant," as referred to herein, is a polypeptide substantially homologous to a native or reference polypeptide, but which has an amino acid sequence different from that of the native or reference polypeptide because of one or a plurality of deletions, insertions or substitutions. Variant polypeptide-encoding DNA sequences encompass sequences that comprise one or more additions, deletions, or substitutions of nucleotides when compared to a native or reference DNA sequence, but that encode a variant protein or fragment thereof that retains activity of the non-variant polypeptide. A wide variety of PCR-based site-specific mutagenesis approaches are known in the art and can be applied by the ordinarily skilled artisan.

A variant amino acid or DNA sequence can be at least 90%, at least 91%, at least 92%, at least 93%, at least 94%, at least 95%, at least 96%, at least 97%, at least 98%, at least 99%, or more, identical to a native or reference sequence. The degree of homology (percent identity) between a native and a mutant sequence can be determined, for example, by comparing the two sequences using freely available computer programs commonly employed for this purpose on the world wide web (e.g., BLASTp or BLASTn with default settings).

Alterations of the native amino acid sequence can be accomplished by any of a number of techniques known to one of skill in the art. Mutations can be introduced, for example, at particular loci by synthesizing oligonucleotides containing a mutant sequence, flanked by restriction sites permitting ligation to fragments of the native sequence. Following ligation, the resulting reconstructed sequence encodes an analog having the desired amino acid insertion, substitution, or deletion. Alternatively, oligonucleotide-directed site-specific mutagenesis procedures can be employed to provide an altered nucleotide sequence having particular codons altered according to the substitution, deletion, or insertion required. Techniques for making such alterations are well established and include, for example, those disclosed by Walder et al. (Gene 42:133, 1986); Bauer et al. (Gene 37:73, 1985); Craik (BioTechniques, January 1985, 12-19); Smith et al. (Genetic Engineering: Principles and Methods, Plenum Press, 1981); and U.S. Pat. Nos. 4,518,584 and 4,737,462, which are herein incorporated by reference in their entireties. Any cysteine residue not involved in maintaining the proper conformation of a polypeptide also can be substituted, generally with serine, to improve the oxidative stability of the molecule and prevent aberrant crosslinking. Conversely, cysteine bond(s) can be added to a polypeptide to improve its stability or facilitate oligomerization.

As used herein, the term "DNA" is defined as deoxyribonucleic acid. The term "polynucleotide" is used herein interchangeably with "nucleic acid" to indicate a polymer of nucleosides. Typically a polynucleotide is composed of nucleosides that are naturally found in DNA or RNA (e.g., adenosine, thymidine, guanosine, cytidine, uridine, deoxyadenosine, deoxythymidine, deoxyguanosine, and deoxycytidine) joined by phosphodiester bonds. However the term encompasses molecules comprising nucleosides or nucleoside analogs containing chemically or biologically modified bases, modified backbones, etc., whether or not found in naturally occurring nucleic acids, and such molecules may be preferred for certain applications. Where this application refers to a polynucleotide it is understood that both DNA, RNA, and in each case both single- and double-stranded forms (and complements of each single-stranded molecule) are provided. "Polynucleotide sequence" as used herein can refer to the polynucleotide material itself and/or to the sequence information (i.e., the succession of letters used as abbreviations for bases) that biochemically characterizes a specific nucleic acid. A polynucleotide sequence presented herein is presented in a 5' to 3' direction unless otherwise indicated.

The term "polypeptide" as used herein refers to a polymer of amino acids. The terms "protein" and "polypeptide" are used interchangeably herein. A peptide is a relatively short polypeptide, typically between about 2 and 60 amino acids in length. Polypeptides used herein typically contain amino acids such as the 20 L-amino acids that are most commonly found in proteins. However, other amino acids and/or amino acid analogs known in the art can be used. One or more of the amino acids in a polypeptide may be modified, for example, by the addition of a chemical entity such as a carbohydrate group, a phosphate group, a fatty acid group, a linker for conjugation, functionalization, etc. A polypeptide that has a nonpolypeptide moiety covalently or noncovalently associated therewith is still considered a "polypeptide." Exemplary modifications include glycosylation and palmitoylation. Polypeptides can be purified from natural sources, produced using recombinant DNA technology or synthesized through chemical means such as conventional solid phase peptide synthesis, etc. The term "polypeptide sequence" or "amino acid sequence" as used herein can refer to the polypeptide material itself and/or to the sequence information (i.e., the succession of letters or three letter codes used as abbreviations for amino acid names) that biochemically characterizes a polypeptide. A polypeptide sequence presented herein is presented in an N-terminal to C-terminal direction unless otherwise indicated.

In some embodiments, a nucleic acid encoding a polypeptide as described herein (e.g., a protein that facilitates immune surveillance evasion (e.g., a TAP inhibitor or an HLA homolog), a marker, a suicide protein, or a therapeutic protein (e.g., a CAR polypeptide)) is comprised within a vector. In some of the aspects described herein, a nucleic acid sequence encoding a given polypeptide as described herein, or any module thereof, is operably linked to a vector. The term "vector," as used herein, refers to a nucleic acid construct designed for delivery to a host cell or for transfer between different host cells. As used herein, a vector can be viral or non-viral. The term "vector" encompasses any genetic element that is capable of replication when associated with the proper control elements and that can transfer gene sequences to cells. A vector can include, but is not limited to, a cloning vector, an expression vector, a plasmid, phage, transposon, cosmid, artificial chromosome, virus, virion, etc.

As used herein, the term "expression vector" refers to a vector that directs expression of an RNA or polypeptide from sequences linked to transcriptional regulatory sequences on the vector. The sequences expressed will often, but not necessarily, be heterologous to the cell. An expression vector may comprise additional elements, for example, the expression vector may have two replication systems, thus allowing it to be maintained in two organisms, for example in human cells for expression and in a prokaryotic host for cloning and amplification. The term "expression" refers to the cellular processes involved in producing RNA and proteins and as appropriate, secreting proteins, including where applicable, but not limited to, for example, transcription, transcript processing, translation and protein folding, modification and processing. "Expression products" include RNA transcribed from a gene, and polypeptides obtained by translation of mRNA transcribed from a gene. The term "gene" means the nucleic acid sequence which is transcribed (DNA) to RNA in vitro or in vivo when operably linked to appropriate regulatory sequences. The gene may or may not include regions preceding and following the coding region, e.g., 5' untranslated (5'UTR) or "leader" sequences and 3' UTR or "trailer" sequences, as well as intervening sequences (introns) between individual coding segments (exons).

As used herein, the term "viral vector" refers to a nucleic acid vector construct that includes at least one element of viral origin and has the capacity to be packaged into a viral vector particle. The viral vector can contain a nucleic acid encoding a polypeptide as described herein in place of non-essential viral genes. The vector and/or particle may be utilized for the purpose of transferring nucleic acids into cells either in vitro or in vivo. Numerous forms of viral vectors are known in the art.

By "recombinant vector" is meant a vector that includes a heterologous nucleic acid sequence, or "transgene" that is capable of expression in vivo. It should be understood that the vectors described herein can, in some embodiments, be combined with other suitable compositions and therapies. In some embodiments, the vector is episomal. The use of a suitable episomal vector provides a means of maintaining the nucleotide of interest in the subject in high copy number extra-chromosomal DNA thereby eliminating potential effects of chromosomal integration.

Optionally, the vectors described herein can include multi-cistronic constructs, which include multiple genes for expression. These constructs can include linkers separating the different coding sequences, which facilitate cleavage of the generated polyprotein. In various examples, the linkers are or include viral 2A proteins (e.g., T2A, P2A, E2A, and F2A).

As used herein, the terms "treat," "treatment," "treating," or "amelioration" refer to therapeutic treatments, wherein the object is to reverse, alleviate, ameliorate, inhibit, slow down, or stop the progression or severity of a condition associated with a disease or disorder, e.g., acute lymphoblastic leukemia or other cancer, disease, or disorder. The term "treating" includes reducing or alleviating at least one adverse effect or symptom of a condition, disease, or disorder. Treatment is generally "effective" if one or more symptoms or clinical markers are reduced. Alternatively, treatment is "effective" if the progression of a disease is reduced or halted. That is, "treatment" includes not just the improvement of symptoms or markers, but also a cessation of, or at least slowing of, progress, or worsening of symptoms compared to what would be expected in the absence of treatment. Beneficial or desired clinical results include, but are not limited to, alleviation of one or more symptom(s), diminishment of extent of disease, stabilized (i.e., not worsening) state of disease, delay or slowing of disease progression, amelioration or palliation of the disease state, remission (whether partial or total), and/or decreased mortality, whether detectable or undetectable. The term "treatment" of a disease also includes providing relief from the symptoms or side-effects of the disease (including palliative treatment).

As used herein, the term "pharmaceutical composition" refers to the active agent in combination with a pharmaceutically acceptable carrier e.g., a carrier commonly used in the pharmaceutical industry. The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio. In some embodiments of any of the aspects, a pharmaceutically acceptable carrier can be a carrier other than water. In some embodiments of any of the aspects, a pharmaceutically acceptable carrier can be a cream, emulsion, gel, liposome, nanoparticle, and/or ointment. In some embodiments of any of the aspects, a pharmaceutically acceptable carrier can be an artificial or engineered carrier, e.g., a carrier in which the active ingredient would not be found to occur in nature.

As used herein, the term "administering," refers to the placement of a therapeutic or pharmaceutical composition as disclosed herein into a subject by a method or route which results in at least partial delivery of the agent at a desired site. Pharmaceutical compositions comprising agents as disclosed herein can be administered by any appropriate route which results in an effective treatment in the subject.

A "T cell" or "T lymphocyte" is a type of lymphocyte (a subtype of white blood cell) that plays a central role in cell-mediated immunity. T cells can be distinguished from other lymphocytes, such as B cells and natural killer (NK) cells due to expression of a cell surface T cell receptor. T cells include, e.g., naïve T cells, central memory T cells, and effector memory T cells. A "modified T cell" or "modified T lymphocyte" (these terms are used interchangeably herein) as referred to herein is a T cell that is modified (e.g., genetically modified) to have reduced or eliminated (i.e., null) TCR expression or activity due to, e.g., a deletion or mutation (e.g., a frame shift mutation), or other knock down or knock out, of CD3ζ, TRAC, and/or TRBC. A "modified T cell" can be further modified to express a therapeutic protein such as, for example, a chimeric antigen receptor (CAR), which renders the "modified T cell" as being a CAR-T cell, which includes the CD3ζ, TRAC, and/or TRBC-related modification. "Modified T cells" can also, optionally, be modified to express one or more proteins that facilitate evasion of host immune surveillance, e.g., an inhibitor of TAP or an HLA homolog, as described further below. Addition, optional modifications include mutation or deletions affecting HLA expression (e.g., mutation or deletion of the HLA locus on chromosome 6), and expression of HLA-G and/or HLA-E.

The term "statistically significant" or "significantly" refers to statistical significance and generally means a two standard deviation (2SD) or greater difference.

Other than in the operating examples, or where otherwise indicated, all numbers expressing quantities of ingredients or reaction conditions used herein should be understood as modified in all instances by the term "about." The term "about" when used in connection with percentages can mean ±1%.

As used herein, the term "comprising" means that other elements can also be present in addition to the defined elements presented. The use of "comprising" indicates inclusion rather than limitation.

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of additional elements that do not materially affect the basic and novel or functional characteristic(s) of that embodiment of the technology.

The singular terms "a," "an," and "the" include plural referents unless context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The abbreviation, "e.g." is derived from the Latin exempli gratia, and is used herein to indicate a non-limiting example. Thus, the abbreviation "e.g." is synonymous with the term "for example."

In some embodiments of any of the aspects, the disclosure described herein does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and also animals resulting from such processes.

Other terms are defined within the description of the various aspects and embodiments of the technology as set forth below and elsewhere herein.

The invention provides several advantages. For example, no T cell receptor signaling can occur without CD3ζ, so eliminating CD3ζ expression, according to certain aspects of the present invention, eliminates the risk of GvH disease. This also is advantageous in the context of T cells modified to express new receptor molecules (e.g., CARs), as it eliminates competition between the new receptor molecules with endogenous T cell receptor signaling molecules.

In addition, in prior methods (e.g., methods involving deletion of TRAC sequences), modified T cells are rapidly rejected by recipients, because they continue to express their allogeneic HLA alleles. This problem is addressed by the present invention, which includes the option of expressing heterologous proteins (e.g., viral proteins) that can reduce the incidence of rejection. Accordingly, the present invention facilitates adoptive T cell therapy by providing modified T cells that can both lack any native T cell receptor expression, as well as evade rejection mediated by the immune system of a recipient of the cells. The resulting cells are thus safer to use, as well as long-lasting.

Additional features and advantages of the invention will be apparent from the following detailed description, the claims, and the drawings.

DETAILED DESCRIPTION

Figure 1:
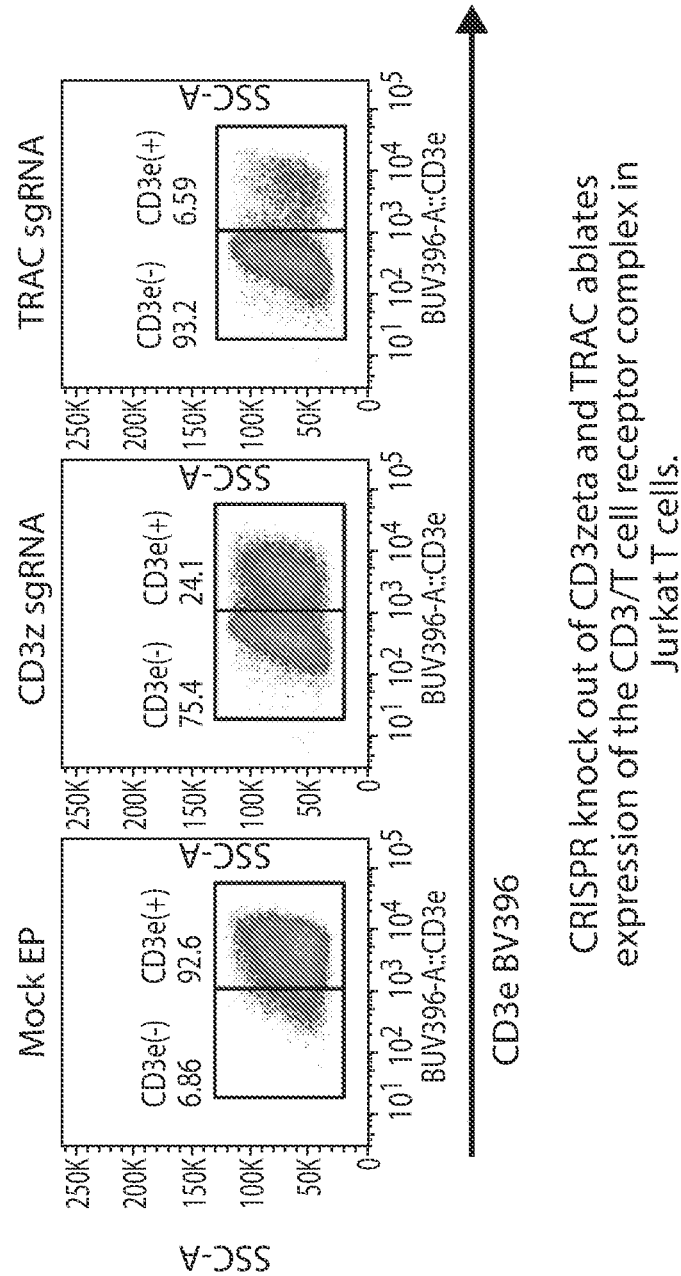
FIG. 1 shows the results of flow cytometry analysis of Jurkat T cells in which CD3ζ or TRAC were knocked out using CRISPR.

The invention provides T cells that are modified to have reduced expression (e.g., partial reduction in expression or complete inhibition of expression) of the T Cell Receptor (TCR), due to mutation or deletion of CD3ζ, T Cell Receptor Alpha Chain (TRAC), and/or T Cell Receptor Beta Chain (TRBC) sequences. In one example, partial or complete inhibition of expression of a CD3ζ gene is achieved due to, e.g., mutation or deletion of CD3ζ sequences. In the absence of CD3ζ, the T cell receptor complex cannot form.

Accordingly, modified T cells of the invention can be used as "universal" T cells in the context of, e.g., adoptive T cell therapy. In one example, which is described further below, the modified T cells are transduced with sequences encoding a chimeric antigen receptor (CAR) directed against, e.g., a cancer-associated antigen, and then are administered to patients to treat, e.g., cancer. In other examples, the modified cells are used in the context of infectious disease or organ transplantation.

Optionally, the modified T cells are further modified so as to avoid or reduce the incidence of rejection of the cells when administered to patients. These further modifications are particularly advantageous in the context of allogeneic T cell therapy, but may also be useful in autologous approaches, e.g., when a heterologous protein is expressed by an autologous, modified T cell.

In addition to modified T cells, the invention also provides methods of using the modified T cells, as well as related compositions and kits. The modified T cells, methods, compositions, and kits of the invention are described in more detail, in an exemplary manner, below.

T Cells

T cells (e.g., human T cells) that can be used in the invention include autologous cells, obtained from the subject to whom the cells are later to be administered, after ex vivo modification and expansion. For example, the T cells can be obtained from an individual having or diagnosed as having cancer, an infectious disease, an autoimmune disease, or a plasma cell disorder. T cells can also be obtained from allogeneic donors, which are non-genetically identical individuals of the same species as the intended recipients of the cells. T cells are typically obtained from peripheral blood that is collected from a subject by, e.g., venipuncture or withdrawal through an implanted port or catheter. Optionally, the blood can be obtained by a process including leukapheresis, in which white cells are obtained from the blood of a subject, while other blood components are returned to the subject. Blood or leukapheresis product (fresh or cryopreserved) is processed to enrich for T cells using methods known in the art. Thus, for example, density gradient centrifugation (using, e.g., Ficoll) and/or counter-flow centrifugal elutriation can be carried out to enrich for mononuclear cells (including T cells). A T cell stimulation step employing, e.g., CD3/CD28 antibodies coated on magnetic beads or artificial antigen presenting cells (aAPCs) expressing, e.g., cell surface-bound anti-CD3 and anti-CD28 antibody fragments (see below), can further be carried out in order to stimulate T cells and to deplete other cells, e.g., B cells. The T cells of enriched T cell preparations can then be subject to genetic modification. As an alternative to peripheral blood, tissues including bone marrow, lymph nodes, spleen, and tumors can be used as a source for T cells. The T cells can be of human, primate, hamster, rabbit, rodent, cow, pig, sheep, horse, goat, dog, or cat origin, but any other mammalian cell may be used. In a certain embodiments of any aspect, the T cell is human.

Modification of T Cells

T cells can be modified in several ways, according to the invention, to enhance their use in therapeutic methods (e.g., adoptive T cell therapy). These modifications include: (i) reduced CD32, TRAC, and/or TRBC expression by, e.g., deletion/mutation (e.g., frame shift mutation) of CD3ζ, TRAC, and/or TRBC sequences, (ii) expression of one or more proteins that facilitate immune surveillance evasion (e.g., a TAP inhibitor or an HLA homolog) (or deletion of HLA Class I and expression of HLA-G), (iii) expression of marker and/or suicide genes, and/or (iv) expression of therapeutic proteins, such as chimeric antigen receptors (CARs) or heterologous T cell receptors. Examples of each of these types of modifications are provided below.

CD3ζ, TRAC, or TRBC Mutation and Deletion

The T cell receptor complex includes variable T cell receptor α and β chains, as well as three dimeric signaling molecules: CD3δ/ε, CD3γ/ε, and CD3 ζ/ζ. According to the present invention, expression of a CD3ζ (also referred to herein as "CD3z" or "CD3 zeta"), TRAC, and/or TRBC gene is reduced or eliminated. This can be achieved using any of a number of methods that are known in the art. In one example, CD3ζ sequences (e.g., coding or regulatory sequences; see, e.g., ENSEMBL ID ENSG00000198821, as of Jan. 10, 2018), TRAC sequences (e.g., coding or regulatory sequences), and/or TRBC (e.g., coding or regulatory sequences) are mutated or deleted from the genome of T cells using, for example, gene editing methods. Thus, for example, approaches employing RNA/DNA guided endonucleases (e.g., Clustered Regularly Interspersed Short Palindromic Repeats (CRISPR)/Cas9, Cpf1, and Argonaute), Transcription Activator-Like Effector (TALE)-nucleases, zinc finger nucleases (ZFN), or meganucleases can be adapted for use in the invention. Further, methods of engineering nucleases to achieve a desired sequence specificity, and which can be used in the invention, are described, e.g., in Kim (2014); Kim (2012); Belhaj et al. (2013); Urnov et al. (2010); Bogdanove et al. (2011); Jinek et al. (2012) Silva et al. (2011); Ran et al. (2013); Carlson et al. (2012); Guerts et al. (2009); Taksu et al. (2010); and Watanabe et al. (2012); each of which is incorporated by reference herein in its entirety.

In various examples, insertions or deletions are made by gene editing to cause a frame shift mutation, leading to gene knock out (i.e., lack of expression of a functional gene product). In certain examples, such mutations are made to target early coding regions, close to the N-terminus of the protein, in order to maximize disruption and minimize the possibility of low-level protein expression. In various examples, any exon can be targeted for the creation of a frame shift (e.g., an exon coding sequence). As a specific example, a more proximal exon may be targeted.

Specific examples of protocols used in the present invention in the context of CD3ζ include: (i) electroporation of guide RNA targeting CD3ζ with mRNA encoding Cas9 endonuclease, (ii) electroporation of ribonucleoprotein (RNP) made up of pre-complex guide RNA and cas9 endonuclease protein, and (iii) expression of guide RNA using a human RNA polymerase promoter encoded in a CAR lentiviral backbone with electroporation of cas9 protein or mRNA.

Alternatively, reduction or elimination of CD3ζ, TRAC, and/or TRBC expression can be achieved by the use of an inhibitory nucleic acid. As used herein, an "inhibitory nucleic acid" refers to a nucleic acid molecule that can inhibit the expression of a target gene or mRNA and includes, e.g., double-stranded RNAs (dsRNAs), inhibitory RNAs (iRNAs), and the like. Inhibitory nucleic acid technology is more fully described in, e.g., Wilson, R C, and Doudna, J A (2013) Annual Review of Biophysics 42(217-239) and reference cited therein.

Expression of Proteins that Facilitate Evasion of Immune Surveillance

Modified T cells characterized by reduced or eliminated expression of a functional TOR (due to, e.g., a CD3ζ, TRAC, and/or TRBC gene deletion, e.g., a frame shift mutation) can advantageously be used in the context of adoptive T cell therapy methods, such as those described herein. As described further below, these modified T cells can further be modified to express a chimeric antigen receptor (CAR), in order to direct the modified T cell to a target cell (e.g., a tumor cell). However, the function of the modified T cells can be further improved, particularly in the context of allogeneic transfer methods, by one or more additional genetic modifications. In more detail, genetically modified T cells lacking expression of an endogenous T cell receptor (due to, e.g., CD3ζ, TRAC, and/or TRBC gene deletion or mutation, as described herein) are susceptible to attack by the immune system (T cell and NK-mediated rejection) of the subject to whom they are administered. Evasion of this attack can be achieved by the expression of certain heterologous proteins in the modified T cells. Accordingly, expression of these proteins can be used to increase persistence of the administered, modified T cells. Heterologous proteins that can be used in this context include, for example, viral proteins that facilitate immune evasion. Examples of these proteins are described as follows and include, e.g., transporter associated with antigen processing (TAP) inhibitors and HLA homologs. Expression of these proteins can also be applicable in the autologous setting, where reduced immune response to an expressed transgene may be desirable.

Thus, in one example, viral inhibitors of TAP can be expressed in modified T cells of the invention. TAP plays a central role in antigen processing and, in particular, transport of cytosolic peptides into the endoplasmic reticulum (ER) for MHC presentation. Without effective TAP transport, cells are unable to load and express HLA class I molecules and, thus, inhibiting TAP can facilitate immune evasion. Viral inhibitors of TAP that can be used in the invention include, for example, cytomegalovirus (CMV) viral protein US6, herpes simplex virus (HSV) viral protein ICP47, bovine herpes virus-1 (BoHV-1) protein UL49.5, and Epstein Barr virus (EBV) protein BNLF2a.

In another example, a complete or partial (signal peptide) CMV UL40 protein is expressed in the modified T cells of the invention. UL40 has homology with HLA Class I and does not require TAP-dependent processing for transport into the ER. Following transport, UL40 peptides are able to bind to non-classical HLA-E, facilitating surface expression. When expressed, HLA-E will inhibit NK-mediated rejection via the inhibitory receptor CD94/NKG2A. In this way, expression of UL40 provides protection to modified T cells from host immune system attack.

In a further example, CMV UL18 is expressed in the modified T cells of the invention. UL18 is a viral HLA homolog that, when expressed, is able to inhibit LIR+NK-mediated rejection. UL18 requires beta-2 microglobulin for cell surface expression, and can be augmented by co-expression of UL40. Another example of an HLA homolog that can be used in the invention is UL142.

As an alternative to (or in addition to) adding genes encoding proteins that facilitate immune surveillance evasion, the modified T cells of the invention can be further modified to delete the endogenous HLA locus on chromosome 6. In another example, the B2M locus is targeted (Ensembl ID ENSG00000166710, as of Jan. 10, 2018). If such a deletion is made, then the T cells will be susceptible to NK-mediated lysis. To counter this, the cells can be transduced to express the universal HLA molecule HLA-G or proteins, or portions of proteins that increase the expression of HLA-E on the surface of cells such as complete or partial UL40, or UL18.

In certain embodiments, an individual gene expressing a protein that facilitates immune surveillance evasion is expressed in a modified T cell of the invention. In other embodiments, combinations of such proteins are expressed in such cells. In specific examples, UL40, US6, and UL18 are expressed together using, e.g., a multi-cistronic vector as described herein.

Sequences of exemplary proteins that can be expressed in connection with facilitating evasion of immune surveillance include those listed below, as well as functional variants thereof.

| Protein | SEQ ID | Sequence |
| --- | --- | --- |
| CMV US6 | 1 | MDLLIRLGFLLMCALPTPGERSSRDPKTLLSLSPRQQACVPRTKSHRPVCYNDTG<br>DCTDADDSWKQLGEDFAHQCLQAAKKRPKTHKSRPNDRNLEGRLTCQRVRRLL<br>PCDLDIHPSHRLLTLMNNCVCDGAVWNAFRLIERHGFFAVTLYLCCGITLLVVILAL<br>LCSITYESTGRGIRRCGS |
| HSV ICP47 | 2 | MSWALEMADTFLDTMRVGPRTYADVRDEINKRGREDREAARTAVHDPERPLLRS<br>PGLLPEIAPNASLGVAHRRTGGTVTDSPRNPVTR |
| BoHV-1 UL49.5 | 3 | MPRSPLIVAVVAAALFAIVRGRDPLLDAMRREGAMDFWSAGCYARGVPLSEPPQ<br>ALVVFYVALTAVMVAVALYAYGLCFRLMGASGPNKKESRGRG |
| EBV BNLF2a | 4 | MVHVLERALLEQQSSACGLPGSSTETRPSHPCPEDPDVSRLRLLLVVLCVLFGL<br>LCLLLI |
| CMV UL40 | 5 | MNKFSNTRIGFTCAVMAPRTLILTVGLLCMRIRSLLCSPAETTVTTAAVTSAHGPL<br>CPLVFQGWAYAVYHQGDMALMTLDVYCCRQTSNNTVVAFSHHPADNTLLIEVG<br>NNTRRHVDGISCQDHFRAQHQDCPAQTVHVRGVNESAFGLTHLQSCCLNEHSQ<br>LSERVAYHLKLRPATFGLETWAMYTVGILALGSFSSFYSQIARSLGVLPNDHHYAL<br>KKA |
| CMV UL18 | 6 | MMTMWCLTLFVLWMLRVVGMHVLRYGYTGIFDDTSHMTLTVVGIFDGQHFFTYH<br>VNSSDKASSRANGTISWMANVSAAYPTYLDGERAKGDLIFNQTEQNLLELEIALGY<br>RSQSVLTWTHECNTTENGSFVAGYEGFGWDGETLMELKDNLTLWTGPNYEISWL<br>KQNKTYIDGKIKNISEGDTTIQRNYLKGNCTQWSVIYSGFQTPVTHPVVKGGVRNQ<br>NDNRAEAFCTSYGFFPGEINITFIHYGNKAPDDSEPQCNPLLPTFDGTFHQGCYVA<br>IFCNQNYTCRVTHGNWTVEIPISVTSPDDSSSGEVPDHPTANKRYNTMTISSVLLAL<br>LLCALLFAFLHYFTTLKQYLRNLAFAWRYRKVRSS |
| HLA-G | 7 | MVVMAPRTLFLLLSGALTLTETWAGSHSMRYFSAAVSRPGRGEPRFIAMGYVDDT<br>QFVRFDSDSACPRMEPRAPWVEQEGPEYWEEETRNTKAHAQTDRMNLQTLRGY<br>YNQSEASSHTLQWMIGCDLGSDGRLLRGYEQYAYDGKDYLALNEDLRSWTAADT<br>AAQISKRKCEAANVAEQRRAYLEGTCVEWLHRYLENGKEMLQRADPPKTHVTHH<br>PVFDYEATLRCWALGFYPAEIILTWQRDGEDQTQDVELVETRPAGDGTFQKWAAV<br>VVPSGEEQRYTCHVQHEGLPEPLMLRWKQSSLPTIPIMGIVAGLVVLAAVVTGAAV<br>AAVLWRKKSSD |
| HLA-E | 8 | MVDGTLLLLLSEALALTQTWAGSHSLKYFHTSVSRPGRGEPRFISVGYVD<br>DTQFVRFDNDAASPRMVPRAPWMEQEGSEYWDRETRSARDTAQIFRVN<br>LRTLRGYYNQSEAGSHTLQWMHGCELGPDGRFLRGYEQFAYDGKDYLT<br>LNEDLRSWTAVDTAAQISEQKSNDASEAEHQRAYLEDTCVEWLHKYLEK<br>GKETLLHLEPPKTHVTHHPISDHEATLRCWALGFYPAEITLTWQQDGEGH<br>TQDTELVETRPAGDGTFQKWAAVVVPSGEEQRYTCHVQHEGLPEPVTLR |

| Protein | SEQ ID | Sequence |
|---|---|---|
| | | WKPASQPTIPIVGIIAGLVLLGSVVSGAVVAAVIWRKKSSGGKGGSYSKAE<br>WSDSAQGSESHSL |

Expression of Reporter or Suicide Genes

Additional modifications that can be made to the modified T cells of the invention include, e.g., expression of one or more reporter genes. For example, truncated epidermal growth factor receptor (EGFR), lacking the intracellular signaling domain, can be used for in vivo depletion in the event of, e.g., toxicity, using anti-EGFR monoclonal antibodies.

Another exemplary modification includes the expression of a suicide gene in modified T cells of the invention. This can be done to facilitate external, drug-mediated control of administered cells. For example, by use of a suicide gene, modified cells can be depleted from the patient in case of, e.g., an adverse event. In one example, the FK506 binding domain is fused to the caspase9 pro-apoptotic molecule. T cells engineered in this manner are rendered sensitive to the immunosuppressive drug tacrolimus. Other examples of suicide genes are thymidine kinase (TK), CD20, thymidylate kinase, truncated prostate-specific membrane antigen (PSMA), truncated low affinity nerve growth factor receptor (LNGFR), truncated CD19, and modified Fas, which can be triggered for conditional ablation by the administration of specific molecules (e.g., ganciclovir to TK+ cells) or antibodies or antibody-drug conjugates.

Expression of Therapeutic Proteins-Chimeric Antigen Receptors (CARs)

In addition the CD3ζ, TRAC, and/or TRBC gene modification described above, as well as the additional optional modifications described above, the T cells of the invention can further optionally be modified to express a therapeutic protein, such as a chimeric antigen receptor (CAR). The terms "chimeric antigen receptor" or "CAR" or "CARs" as used herein refer to engineered T cell receptors, which graft a ligand or antigen specificity onto T cells (for example, naïve T cells, central memory T cells, effector memory T cells, or combinations thereof). CARs are also known as artificial T-cell receptors, chimeric T-cell receptors, or chimeric immunoreceptors.

A CAR places a chimeric extracellular target-binding domain that specifically binds a target, e.g., a polypeptide, expressed on the surface of a cell to be targeted for a T cell response onto a construct including a transmembrane domain and intracellular domain(s) of a T cell receptor molecule. In one embodiment, the chimeric extracellular target-binding domain comprises the antigen-binding domain(s) of an antibody (e.g., a single chain antibody) that specifically binds an antigen expressed on a cell to be targeted for a T cell response. The properties of the intracellular signaling domain(s) of the CAR can vary as known in the art and as disclosed herein, but the chimeric target/antigen-binding domains(s) render the receptor sensitive to signaling activation when the chimeric target/antigen binding domain binds the target/antigen on the surface of a targeted cell.

With respect to intracellular signaling domains, so-called "first-generation" CARs include those that solely provide CD3ζ signals upon antigen binding. So-called "second-generation" CARs include those that provide both co-stimulation (e.g., CD28 or CD137) and activation (CD3ζ) domains, and so-called "third-generation" CARs include those that provide multiple costimulatory (e.g., CD28 and CD137) domains and activation domains (e.g., CD3ζ). In various embodiments, the CAR is selected to have high affinity or avidity for the target/antigen—for example, antibody-derived target or antigen binding domains will generally have higher affinity and/or avidity for the target antigen than would a naturally-occurring T cell receptor. This property, combined with the high specificity one can select for an antibody provides, highly specific T cell targeting by CAR T cells.

As used herein, a "CAR T cell" or "CAR-T" refers to a T cell which expresses a CAR. When expressed in a T cell, CARs have the ability to redirect T-cell specificity and reactivity toward a selected target in a non-MHC-restricted manner, exploiting the antigen-binding properties of monoclonal antibodies. The non-MHC-restricted antigen recognition gives T-cells expressing CARs the ability to recognize an antigen independent of antigen processing, thus bypassing a major mechanism of tumor escape. The CAR T cells of the present invention include, in addition to a CAR, a further modification, as described herein (i.e., a modification resulting in decreased or eliminated TCR expression, due to mutation or deletion of CD3ζ, TRAC, and/or TRBC sequences as described herein). These modifications are optionally in combination with one or more further modifications including, e.g., the expression of one or more protein that facilitates immune surveillance evasion (e.g., a TAP inhibitor or an HLA homolog), suicide genes, and/or marker genes, as noted above. As an alternative to expressing a protein that facilitates immune surveillance evasion, the cell can be deleted for expression of the HLA locus on chromosome 6, and further optionally express HLA-G, as explained above.

As used herein, the term "extracellular target binding domain" refers to a polypeptide found on the outside of the cell which is sufficient to facilitate binding to a target. The extracellular target binding domain will specifically bind to its binding partner, i.e., the target. As non-limiting examples, the extracellular target-binding domain can include an antigen-binding domain of an antibody, or a ligand, which recognizes and binds with a cognate binding partner (for example, CD19, BCMA, or CD3ζ) protein. In this context, a ligand is a molecule which binds specifically to a portion of a protein and/or receptor. The cognate binding partner of a ligand useful in the methods and compositions described herein can generally be found on the surface of a cell. Ligand: cognate partner binding can result in the alteration of the ligand-bearing receptor, or activate a physiological response, for example, the activation of a signaling pathway. In one embodiment, the ligand can be non-native to the genome. Optionally, the ligand has a conserved function across at least two species. In one embodiment, the extracellular target binding domain comprises a non-antibody ligand (e.g., A PRoliferation-Inducing Ligand (APRIL)).

Antibody Reagents

In various embodiments, the CARs described herein include an antibody reagent or an antigen-binding domain thereof as an extracellular target-binding domain.

As used herein, the term "antibody reagent" refers to a polypeptide that includes at least one immunoglobulin variable domain or immunoglobulin variable domain sequence and which specifically binds a given antigen. An antibody reagent can comprise an antibody or a polypeptide comprising an antigen-binding domain of an antibody. In some embodiments of any of the aspects, an antibody reagent can comprise a monoclonal antibody or a polypeptide comprising an antigen-binding domain of a monoclonal antibody. For example, an antibody can include a heavy (H) chain variable region (abbreviated herein as $V_H$), and a light (L) chain variable region (abbreviated herein as $V_L$). In another example, an antibody includes two heavy (H) chain variable regions and two light (L) chain variable regions. The term "antibody reagent" encompasses antigen-binding fragments of antibodies (e.g., single chain antibodies, Fab and sFab fragments, F(ab')2, Fd fragments, Fv fragments, scFv, CDRs, and domain antibody (dAb) fragments (see, e.g., de Wildt et al., Eur J. Immunol. 1996; 26 (3): 629-39; which is incorporated by reference herein in its entirety)) as well as complete antibodies. An antibody can have the structural features of IgA, IgG, IgE, IgD, or IgM (as well as subtypes and combinations thereof). Antibodies can be from any source, including mouse, rabbit, pig, rat, and primate (human and non-human primate) and primatized antibodies. Antibodies also include midibodies, humanized antibodies, chimeric antibodies, and the like. Fully human antibody binding domains can be selected, for example, from phage display libraries using methods known to those of ordinary skill in the art.

The $V_H$ and $V_L$ regions can be further subdivided into regions of hypervariability, termed "complementarity determining regions" ("CDRs"), interspersed with regions that are more conserved, termed "framework regions" ("FR"). The extent of the framework region and CDRs has been precisely defined (see, Kabat, E. A., et al. (1991) Sequences of Proteins of Immunological Interest, Fifth Edition, U.S. Department of Health and Human Services, NIH Publication No. 91-3242, and Chothia, C. et al. (1987) J. Mol. Biol. 196:901-917; which are incorporated by reference herein in their entireties). Each $V_H$ and $V_L$ is typically composed of three CDRs and four FRs, arranged from amino-terminus to carboxy-terminus in the following order: FR1, CDR1, FR2, CDR2, FR3, CDR3, and FR4.

In one embodiment, the antibody or antibody reagent is not a human antibody or antibody reagent, (e.g., the antibody or antibody reagent is mouse), but has been humanized. A "humanized antibody or antibody reagent" refers to a non-human antibody or antibody reagent that has been modified at the protein sequence level to increase its similarity to antibody or antibody reagent variants produced naturally in humans. One approach to humanizing antibodies employs the grafting of murine or other non-human CDRs onto human antibody frameworks.

In one embodiment, an extracellular target binding domain of a CAR comprises or consists essentially of a single-chain Fv (scFv) fragment created by fusing the $V_H$ and $V_L$ domains of an antibody, generally a monoclonal antibody, via a flexible linker peptide. In various embodiments, the scFv is fused to a transmembrane domain and to a T cell receptor intracellular signaling domain, e.g., an engineered intracellular signaling domain as described herein.

In one embodiment, the CARs useful in the technology described herein comprise at least two antigen-specific targeting regions, an extracellular domain, a transmembrane domain, and an intracellular signaling domain. In such embodiments, the two or more antigen-specific targeting regions target at least two different antigens and may be arranged in tandem and separated by linker sequences. In another embodiment, the CAR is a bispecific CAR. A bispecific CAR is specific to two different antigens.

Target/Antigen

Any cell-surface moiety can be targeted by a CAR. Most often, the target will be a cell-surface polypeptide differentially or preferentially expressed on a cell one wishes to target for a T cell response. In this regard, tumor antigens or tumor-associated antigens are attractive targets, providing a means to target tumor cells while avoiding or at least limiting collateral damage to non-tumor cells or tissues. Non-limiting examples of tumor antigens or tumor-associated antigens include CD19, BCMA, CD3ζ, CEA, Immature laminin receptor, TAG-72, HPV E6 and E7, BING-4, Calcium-activated chloride channel 2, Cyclin B1, 9D7, Ep-CAM, EphA3, Her2/neu, Telomerase, Mesothelin, SAP-1, Survivin, BAGE family, CAGE family, GAGE family, MAGE family, SAGE family, XAGE family, NY-ESO-1/LAGE-1, PRAME, SSX-2, Melan-A/MART-1, Gp100/pmel17, Tyrosinase, TRP-1/-2, MC1R, BRCA1/2, CDK4, MART-2, p53, Ras, MUC1, and TGF-βRII.

In one embodiment, the target is B cell maturation antigen (BCMA), also known as tumor necrosis factor receptor superfamily member 17 (TNFRSF17). BCMA is a cell surface receptor expressed preferentially on mature B lymphocytes that specifically recognizes B cell activating factor (BAFF). BCMA sequences are known for a number of species, e.g., human BCMA (NCBI Gene ID: 608) polypeptide (e.g., NCBI Ref Seq NP_001183.2) and mRNA (e.g., NCBI Ref Seq NM_001192.2). BCMA can refer to human BCMA, including naturally occurring variants, molecules, and alleles thereof. In some embodiments of any of the aspects, e.g., in veterinary applications, BCMA can refer to the BCMA of, e.g., dog, cat, cow, horse, pig, and the like. Homologs and/or orthologs of human BCMA are readily identified for such species by one of skill in the art, e.g., using the NCBI ortholog search function or searching available sequence data for a given species for sequence similar to a reference BCMA sequence.

In one embodiment, the BCMA-binding sequence comprises a ligand of BCMA or an antibody reagent that specifically binds BCMA. In one embodiment, the antibody reagent that specifically binds BCMA is a scFv from a humanized anti-BCMA m murine antibody. The orientation of a humanized murine antibody-derived single-chain variable fragment can be $V_L$-$V_H$ or $V_H$-$V_L$.

In one embodiment, the target is CD37. CD37 is cell surface protein that contains four hydrophobic transmembrane domains. CD37 is expressed exclusively on immune cells; CD37 is highly expressed on mature B cells, and moderately expressed on T cells and myloid cells. CD37 sequences are known for a number of species, e.g., human CD37 (NCBI Gene ID: 951) polypeptide (e.g., NCBI Ref Seq NP_001035120.1) and mRNA (e.g., NCBI Ref Seq NM_001040031.1). CD37 can refer to human CD37, including naturally occurring variants, molecules, and alleles thereof. In some embodiments of any of the aspects, e.g., in veterinary applications, CD37 can refer to the CD37 of, e.g., dog, cat, cow, horse, pig, and the like. Homologs and/or orthologs of human CD37 are readily identified for such species by one of skill in the art, e.g., using the NCBI ortholog search function or searching available sequence data for a given species for sequence similar to a reference CD37 sequence. In one embodiment, the CD37-binding sequence comprises a ligand of CD37 or an antibody reagent that specifically binds CD37.

Transmembrane Domain

Each CAR as described herein necessarily includes a transmembrane domain that joins the extracellular target-binding domain to the intracellular signaling domain.

As used herein, "transmembrane domain" (TM domain) refers to the generally hydrophobic region of the CAR which crosses the plasma membrane of a cell. The TM domain can be the transmembrane region or fragment thereof of a transmembrane protein (for example a Type I transmembrane protein or other transmembrane protein), an artificial hydrophobic sequence, or a combination thereof. While specific examples are provided herein, other transmembrane domains will be apparent to those of skill in the art and can be used in connection with alternate embodiments of the technology. A selected transmembrane region or fragment thereof would preferably not interfere with the intended function of the CAR. As used in relation to a transmembrane domain of a protein or polypeptide, "fragment thereof" refers to a portion of a transmembrane domain that is sufficient to anchor or attach a protein to a cell surface.

In one embodiment, the transmembrane domain or fragment thereof of a CAR is derived from or comprises the transmembrane domain of CD8. In an alternate embodiment, the transmembrane domain or fragment thereof of the CAR described herein comprises a transmembrane domain selected from the transmembrane domain of an alpha, beta or zeta chain of a T-cell receptor, CD28, CD3 epsilon, CD45, CD4, CD5, CD8, CD9, CD16, CD22, CD33, CD37, CD64, CD80, CD86, CD134, CD137, CD154, KIRDS2, OX40, CD2, CD27, LFA-1 (CDI Ia, CD18), ICOS (CD278), 4-1BB (CD137), GITR, CD40, BAFFR, HVEM (LIGHTR), SLAMF7, NKp80 (KLRFI), CD160, CD19, IL2R beta, IL2R gamma, IL7R a, ITGA1, VLA1, CD49a, ITGA4, IA4, CD49D, ITGA6, VLA-6, CD49f, ITGAD, CDI Id, ITGAE, CD103, ITGAL, CDI Ia, LFA-1, ITGAM, CDI Ib, ITGAX, CDI Ic, ITGB1, CD29, ITGB2, CD18, LFA-1, ITGB7, TNFR2, DNAM1 (CD226), SLAMF4 (CD244, 2B4), CD84, CD96 (Tactile), CEACAM1, CRT AM, Ly9 (CD229), CD160 (BY55), PSGL1, CD100 (SEMA4D), SLAMF6 (NTB-A, Lyl08), SLAM (SLAMF1, CD150, IPO-3), BLAME (SLAMF8), SELPLG (CD162), LTBR, PAG/Cbp, NKp44, NKp30, NKp46, NKG2D, and/or NKG2C.

CD8 is an antigen preferentially found on the cell surface of cytotoxic T lymphocytes. CD8 mediates cell-cell interactions within the immune system, and acts as a T cell co-receptor. CD8 consists of an alpha (CD8α) and beta (CD8β) chain. CD8a sequences are known for a number of species, e.g., human CD8a, (NCBI Gene ID: 925) polypeptide (e.g., NCBI Ref Seq NP_001139345.1) and mRNA (e.g., NCBI Ref Seq NM_000002.12). CD8 can refer to human CD8, including naturally occurring variants, molecules, and alleles thereof. In some embodiments of any of the aspects, e.g., in veterinary applications, CD8 can refer to the CD8 of, e.g., dog, cat, cow, horse, pig, and the like. Homologs and/or orthologs of human CD8 are readily identified for such species by one of skill in the art, e.g., using the NCBI ortholog search function or searching available sequence data for a given species for sequence similar to a reference CD8 sequence.

Co-Stimulatory Domain

Each CAR described herein can comprise an intracellular domain of a co-stimulatory molecule, or co-stimulatory domain. As used herein, the term "co-stimulatory domain" refers to an intracellular signaling domain of a co-stimulatory molecule. Co-stimulatory molecules are cell surface molecules other than antigen receptors or Fc receptors that provide a second signal required for efficient activation and function of T lymphocytes upon binding to antigen. Illustrative examples of such co-stimulatory molecules include CARD11, CD2, CD7, CD27, CD28, CD30, CD40, CD54 (ICAM), CD83, CD134 (OX40), CD137 (4-1BB), CD150 (SLAMF1), CD152 (CTLA4), CD223 (LAG3), CD270 (HVEM), CD273 (PD-L2), CD274 (PD-L1), CD278 (ICOS), DAP10, LAT, NKD2C SLP76, TRIM, and ZAP70. In one embodiment, the intracellular domain is the intracellular domain of 4-1BB.

4-1BBL is a type 2 transmembrane glycoprotein belonging to the TNF superfamily. 4-1BBL is expressed on activated T lymphocytes. 4-1BBL sequences are known for a number of species, e.g., human 4-1BBL, also known as TNFSF9 (NCBI Gene ID: 8744) polypeptide (e.g., NCBI Ref Seq NP_003802.1) and mRNA (e.g., NCBI Ref Seq NM_003811.3). 4-1BBL can refer to human 4-1BBL, including naturally occurring variants, molecules, and alleles thereof. In some embodiments of any of the aspects, e.g., in veterinary applications, 4-1BBL can refer to the 4-1BBL of, e.g., dog, cat, cow, horse, pig, and the like. Homologs and/or orthologs of human 4-1BBL are readily identified for such species by one of skill in the art, e.g., using the NCBI ortholog search function or searching available sequence data for a given species for sequence similar to a reference 4-1BBL sequence.

Intracellular Signaling Domain

CARs as described herein comprise an intracellular signaling domain. An "intracellular signaling domain" refers to the part of a CAR polypeptide that participates in transducing the message of effective CAR binding to a target antigen into the interior of the immune effector cell to elicit effector cell function, e.g., activation, cytokine production, proliferation, and cytotoxic activity, including the release of cytotoxic factors to the CAR-bound target cell, or other cellular responses elicited following antigen binding to the extracellular CAR domain.

As noted above, CD3 is a T cell co-receptor that facilitates T lymphocyte activation when simultaneously engaged with the appropriate co-stimulation (e.g., binding of a co-stimulatory molecule). A CD3 complex consists of 4 distinct chains; mammalian CD3 consists of a CD3γ chain, a CD3δ chain, and two CD3& chains. These chains associate with a molecule known as the T cell receptor (TCR) and CD3ζ to generate an activation signal in T lymphocytes. A complete TCR complex comprises a TCR, CD3ζ, and the complete CD3 complex.

In some embodiments of any aspect, a CAR polypeptide described herein comprises an intracellular signaling domain that comprises an Immunoreceptor Tyrosine-based Activation Motif or ITAM from CD3 zeta (CD3ζ). In some embodiments of any aspect, the ITAM comprises three motifs of ITAM of CD3ζ(ITAM3). In some embodiments of any aspect, the three motifs of ITAM of CD3ζ are mutated.

ITAMs are known as a primary signaling domains which regulate primary activation of the TCR complex either in a stimulatory way, or in an inhibitory way. Primary signaling domains that act in a stimulatory manner may contain signaling motifs which are known as immunoreceptor tyrosine-based activation motifs or ITAMs. Non-limiting examples of ITAM-containing intracellular signaling domains that are of particular use in the technology include those derived from TCRζ, FcRγ, FcRβ, CD3γ, CD3θ, CD3δ, CD3ε, CD3ζ, CD22, CD79a, CD79b, and CD66d.

One skilled in the art will be capable of introducing mutations into the nucleic acid sequence of a gene or gene product, for example an ITAM, using standard techniques. For example, point mutations can be introduced via site-directed point mutagenesis, a PCR technique. Site-directed mutagenesis kits are commercially available, for instance, through New England Biolabs; Ipswich, MA. Non-limiting examples of alternative methods to introduce point mutations into the nucleic acid sequence of a gene or gene product include cassette mutagenesis or whole plasmid mutagenesis.

In one embodiment, the ITAM utilized in the CAR is based on alternatives to CD3ζ, including mutated ITAMs from CD3ζ (which contains 3 ITAM motifs), truncations of CD3ζ, and alternative splice variants known as CD3ε, CD3θ, and artificial constructs engineered to express fusions between CD3ε or CD3θ and CD3ζ.

In one embodiment, the CD3ζITAM3 sequence corresponds to the sequence of SEQ ID NO: 9; or comprises the sequence of SEQ ID NO: 9; or comprises a sequence with at least 80%, at least 85%, at least 90%, at least 95%, at least 96%, at least 97%, at least 98%, at least 99% or greater sequence identity to the sequence of SEQ ID NO: 9.

In one embodiment, the intracellular signaling domain comprises a CD3ζ ITAM3 sequence selected from SEQ ID NOs: 9, 10, 11, or 12. In one embodiment, the tyrosine residues are mutated to phenylalanine residues, thereby inhibiting the phosphorylation of the native tyrosine residues. Exemplary tyrosine residues that can be mutated include It is contemplated that the tyrosine residues can be mutated to any residue that results in the inhibition of tyrosine phosphorylation. In another embodiment of any aspect, tyrosines are mutated in at least one, at least two, or all three ITAMs (e.g., ITAM I, II, and III).

In one embodiment, the T-cell intracellular signaling domain comprises the ITAMs of CD3 eta (CD3ε), CD3 theta (CD3θ), or CD3ζ. In one embodiment, the T-cell intracellular signaling domain is the ITAM of CD3 eta (CD3ε), CD3 theta (CD3θ), or CD3ζ.

In one embodiment, the intracellular signaling domain comprises a CD3ζ ITAM3 sequence comprising a deletion relative to the CD3ζ ITAM3 sequence of SEQ ID NO: 9.

The sequence of SEQ ID NO: 9 is provided below, followed by additional information concerning SEQ ID NOs: 10, 11, and 12:

```
                                          (SEQ ID NO: 9)
RVKFSRSADAPAYQQGQNQLYNELNLGRREEYDVLDKRRGRDPEMGGKPR

RKNPQEGLYNELQKDKMAEAYSEIGMKGERRRGKGHDGLYQGLSTATKDT

YDALHMQALPPR
```

CD3ζ-mutITAM 1 (SEQ ID NO: 10). As described herein, certain residues are mutated in CD32-ITAM 3 to inhibit the function of CD3ζ-ITAM 3, namely: Y21 and Y32. The locations of these residues are depicted below with bold type.

```
                                         (SEQ ID NO: 10)
RVKFSRSADAPAYQQGQNQLFNELNLGRREEFDVLDKRRGRDPEMGGKPR

RKNPQEGLYNELQKDKMAEAYSEIGMKGERRRGKGHDGLYQGLSTATKDT

YDALHMQALPPR
```

CD3ζ-mutITAM1 and mutITAM2 (SEQ ID NO: 11). As described herein, certain residues are mutated in CD3ζ-ITAM 3 to inhibit the function of CD3ζ-ITAM 3, namely: Y21, Y32, Y59 and Y71. The locations of these residues are depicted below with bold type.

```
                                         (SEQ ID NO: 11)
RVKFSRSADAPAYQQGQNQLFNELNLGRREEFDVLDKRRGRDPEMGGKPR

RKNPQEGLFNELQKDKMAEAFSEIGMKGERRRGKGHDGLYQGLSTATKDT

YDALHMQALPPR
```

CD3ζ-mutITAM1 and mutITAM3 (SEQ ID NO: 12). As described herein, certain residues are mutated in CD3ζ-ITAM 3 to inhibit the function of CD3ζ-ITAM 3, namely: Y21, Y32, Y90 and Y100. The locations of these residues are depicted below with bold type.

```
                                         (SEQ ID NO: 12)
RVKFSRSADAPAYQQGQNQLFNELNLGRREEFDVLDKRRGRDPEMGGKPR

RKNPQEGLYNELQKDKMAEAYSEIGMKGERRRGKGHDGLFQGLSTATKDT

FDALHMQALPPR
```

A deletion relative to the CD3ζ ITAM3 sequence can be performed using techniques well known in the art, for example, CRISPR, TALEN, or ZFN technology (also see above). Methods of engineering nucleases to achieve a desired sequence specificity are known in the art and are described, e.g., in the references cited above.

A more detailed description of CARs and CAR T cells, which can be adapted for use in the invention, can be found, e.g., in Maus et al., Blood 2014 123:2624-35; Reardon et al., Neuro-Oncology 2014 16:1441-1458; Hoyos et al., Haematologica 2012 97:1622; Byrd et al., J Clin Oncol 2014 32:3039-47; Maher et al., Cancer Res 2009 69:4559-4562; and Tamada et al., Clin Cancer Res 2012 18:6436-6445; each of which is incorporated by reference herein in its entirety.

In one embodiment, the CAR further comprises a linker domain. As used herein "linker domain" refers to an oligo- or polypeptide region from about 2 to 100 amino acids in length, which links together any of the domains/regions of the CARs as described herein. In some embodiments, linkers can include or be composed of flexible residues such as glycine and serine so that the adjacent, linked protein domains are free to move relative to one another. Longer linkers may be used when it is desirable to ensure that two adjacent domains do not sterically interfere with one another. Linkers may be cleavable or non-cleavable. Examples of cleavable linkers include 2A linkers (for example T2A), 2A-like linkers or functional equivalents thereof and combinations thereof. In one embodiment, the linker region is T2A derived from *Thosea asigna* virus. Non-limiting examples of linkers that can be used in this technology include P2A and F2A. In addition to use in the context of CARs, these cleavable linkers can also be used in the multicistronic vectors described herein.

In one embodiment, a CAR as described herein further comprises a reporter molecule, e.g., to permit for non-invasive imaging (e.g., positron-emission tomography PET scan). In a bispecific CAR that includes a reporter molecule, the first extracellular binding domain and the second extracellular binding domain can include different or the same reporter molecule. In a bispecific CAR T cell, the first CAR and the second CAR can express different or the same reporter molecule. In another embodiment, a CAR as described herein further comprises a reporter molecule (for example, hygromycin phosphotransferase (hph)) that can be imaged alone or in combination with a substrate or chemical (for example, 9-[4-[$^{18}$F]fluoro-3-(hydroxymethyl)butyl] guanine ([$^{18}$F]FHBG)). In another embodiment, a CAR as described herein further comprises nanoparticles at can be readily imaged using non-invasive techniques (e.g., gold nanoparticles (GNP) functionalized with $^{64}Cu^{2+}$). Labeling of CAR T cells for non-invasive imaging is reviewed, for example, in Bhatnagar P, et al., Integr. Biol. (Camb). 2013 January; 5 (1): 231-238, and Keu K V, et al., Sci Transl Med. 2017 Jan. 18; 9 (373), which are incorporated herein by reference in their entireties.

GFP and mCherry are demonstrated herein as fluorescent tags useful for imaging a CAR expressed on a T cell (e.g., a CAR T cell). It is expected that essentially any fluorescent protein known in the art can be used as a fluorescent tag for this purpose. For clinical applications, the CAR need not include a fluorescent tag or fluorescent protein.

Constructs, Vectors, and Expression

The invention also provides constructs and vectors for use in generating modified T cells, as described herein. In various examples, the invention provides constructs that each include separate coding sequences for multiple proteins to be expressed in a modified T cell of the invention. These separate coding sequences can be separated from one another by a cleavable linker sequence as described herein. For example, sequences encoding viral 2A proteins (e.g., T2A, P2A, E2A, and F2A) can be placed between the separate genes and, when transcribed, can direct cleavage of the generated polyprotein. As noted above, constructs and vectors of the invention can include any of a number of different combinations of sequences. For example, a construct or vector of the invention can include sequences encoding one or more full length or partial sequences (e.g., each) of UL40, US6, UL18, HLA-E, and HLA-G, optionally in combination with a CAR.

Constructs including sequences encoding proteins for expression in the modified T cells of the invention can be comprised within vectors, which are also provided by the invention. In various examples, the vectors are retroviral vectors. Retroviruses, such as lentiviruses, provide a convenient platform for delivery of nucleic acid sequences encoding a gene, or chimeric gene of interest. A selected nucleic acid sequence can be inserted into a vector and packaged in retroviral particles using techniques known in the art. The recombinant virus can then be isolated and delivered to cells, e.g., in vitro or ex vivo. Retroviral systems are well known in the art and are described in, for example, U.S. Pat. No. 5,219,740; Kurth and Bannert (2010) "Retroviruses: Molecular Biology, Genomics and Pathogenesis" Calster Academic Press (ISBN: 978-1-90455-55-4); and Hu and Pathak Pharmacological Reviews 2000 52:493-512; which are incorporated by reference herein in their entirety. Lentiviral system for efficient DNA delivery can be purchased from OriGene; Rockville, MD. In various embodiments, the protein is expressed in the T cell by transfection or electroporation of an expression vector comprising nucleic acid encoding the protein using vectors and methods that are known in the art.

Efficient expression of proteins in modified T cells as described herein can be assessed using standard assays that detect the mRNA, DNA, or gene product of the nucleic acid encoding the proteins. For example, RT-PCR, FACS, northern blotting, western blotting, ELISA, or immunohistochemistry can be used. In various embodiments, the proteins described herein are constitutively expressed. In other embodiments, the proteins are encoded by recombinant nucleic acid sequence.

Therapeutic Methods, Compositions, and Kits

The invention provides methods and compositions for use in treating and preventing diseases and conditions including, for example, cancer, infectious diseases, autoimmune diseases or disorders, plasma cell diseases or disorders, or conditions relating to transplantation in a subject in need thereof (e.g., a subject having or diagnosed as having the disease or condition). These methods include modifying a T cell in a manner described herein, and then administering the modified T cell to the subject. In some embodiments of any of the aspect, the modified T cell (e.g., a CAR-T cell including one or more additional modification as described herein) is stimulated and/or activated prior to administration to the subject.

As used herein, a "condition" includes cancer, an infectious disease, an autoimmune disease or disorder, a plasma cell disease or disorder, or a condition relating to transplantation. Subjects having a disease or condition can be identified by a physician using current methods of diagnosing the disease or condition. Symptoms and/or complications of the disease or condition, which characterize these conditions and aid in diagnosis are well known in the art and include, but are not limited to, fatigue, persistent infections, and persistent bleeding. Tests that may aid in a diagnosis of, e.g., the disease or condition include, but are not limited to, blood screening and bone marrow testing, and are known in the art for a given condition. A family history for a disease or condition, or exposure to risk factors for a disease or condition, can also aid in determining if a subject is likely to have the disease or condition or in making a diagnosis of the disease or condition.

"Cancer" as used herein can refer to a hyperproliferation of cells whose unique trait—loss of normal cellular control—results in unregulated growth, lack of differentiation, local tissue invasion, and metastasis, and can be leukemia, lymphoma, multiple myeloma, or a solid tumor. Non-limiting examples of leukemia include acute myeloid leukemia (AML), chronic myeloid leukemia (CML), acute lymphocytic leukemia (ALL), and chronic lymphocytic leukemia (CLL). In one embodiment, the cancer is ALL or CLL. Non-limiting examples of lymphoma include diffuse large B-cell lymphoma (DLBCL), follicular lymphoma, chronic lymphocytic leukemia (CLL), small lymphocytic lymphoma (SLL), mantle cell lymphoma (MCL), marginal zone lymphomas, Burkitt lymphoma, hairy cell leukemia (HCL). In one embodiment, the cancer is DLBCL or follicular lymphoma. Non-limiting examples of solid tumors include adrenocortical tumor, alveolar soft part sarcoma, carcinoma, chondrosarcoma, colorectal carcinoma, desmoid tumors, desmoplastic small round cell tumor, endocrine tumors, endodermal sinus tumor, epithelioid hemangioendothelioma, Ewing sarcoma, germ cell tumors (solid tumor), giant cell tumor of bone and soft tissue, hepatoblastoma, hepatocellular carcinoma, melanoma, nephroma, neuroblastoma, non-rhabdomyosarcoma soft tissue sarcoma (NRSTS), osteosarcoma, paraspinal sarcoma, renal cell carcinoma, retinoblastoma, rhabdomyosarcoma, synovial sarcoma, and Wilms tumor. Solid tumors can be found in bones, muscles, tissues, or organs, and can be sarcomas or carinomas. It is contemplated that any aspect of the technology described herein can be used to treat all types of cancers, including cancers not listed in the instant application. As used herein, the term "tumor" refers to an abnormal growth of cells or tissues, e.g., of malignant type or benign type.

As used herein, an "autoimmune disease or disorder" is characterized by the inability of one's immune system to distinguish between a foreign cell and a healthy cell. This results in one's immune system targeting one's healthy cells for programmed cell death. Non-limiting examples of autoimmune diseases or disorders include inflammatory arthritis, type 1 diabetes mellitus, multiples sclerosis (MS), psoriasis, inflammatory bowel diseases, systemic lupus erythematosus (SLE), vasculitis, allergic inflammation, such as allergic asthma, atopic dermatitis, and contact hypersensitivity. Other examples of auto-immune-related diseases or disorders, include but are not limited to, rheumatoid arthritis, Graves' disease (overactive thyroid), Hashimoto's thyroiditis (underactive thyroid), celiac disease, Crohn's disease, ulcerative colitis, Guillain-Barre syndrome, primary biliary sclerosis/cirrhosis, sclerosing cholangitis, autoimmune hepatitis, Raynaud's phenomenon, scleroderma, Sjogren's syndrome, Goodpasture's syndrome, Wegener's granulomatosis, polymyalgia rheumatica, temporal arteritis/giant cell arteritis, chronic fatigue syndrome CFS), autoimmune Addison's Disease, ankylosing spondylitis, acute disseminated encephalomyelitis, antiphospholipid antibody syndrome, aplastic anemia, idiopathic thrombocytopenia purpura, myasthenia gravis, opsoclonus myoclonus syndrome, optic neuritis, Ord's thyroiditis, pemphigus, pernicious anaemia, polyarthritis in dogs, Reiter's syndrome, Takayasu's arteritis, warm autoimmune hemolytic anemia, Wegener's granulomatosis, and fibromyalgia (FM).

In one embodiment, the mammalian T cell is obtained for a patient having an immune system disorder that results in abnormally low activity of the immune system, or immune deficiency disorders, which hinders one's ability to fight a foreign cell (i.e., a virus or bacterial cell).

A plasma cell is a white blood cell produced from B lymphocytes, which function to generate and release antibodies needed to fight infections. As used herein, a "plasma cell disorder or disease" is characterized by abnormal multiplication of a plasma cell. Abnormal plasma cells are capable of "crowding out" healthy plasma cells, which results in a decreased capacity to fight a foreign object, such as a virus or bacterial cell. Non-limiting examples of plasma cell disorders include amyloidosis, Waldenstrom's macroglobulinemia, osteosclerotic myeloma (POEMS syndrome), monoclonal gammopathy of unknown significance (MGUS), and plasma cell myeloma.

The compositions described herein (see below) can be administered to a subject having or diagnosed as having a disease or condition. In some embodiments, the methods described herein comprise administering an effective amount of modified T cells (e.g., activated CAR T cells) described herein to a subject in order to alleviate a symptom of the condition. As used herein, "alleviating a symptom of the condition" is ameliorating any condition or symptom associated with the condition. As compared with an equivalent untreated control, such reduction is by at least 5%, 10%, 20%, 40%, 50%, 60%, 80%, 90%, 95%, 99%, or more as measured by any standard technique. A variety of means for administering the compositions described herein to subjects are known to those of skill in the art. In one embodiment, the compositions described herein are administered systemically or locally. In another embodiment, the compositions described herein are administered intravenously. In another embodiment, the compositions described herein are administered at the site of a tumor.

The term "effective amount" as used herein refers to the amount of modified T cells (e.g., activated CAR T cells) needed to alleviate at least one or more symptom of the disease or disorder, and relates to a sufficient amount of the cell preparation or composition to provide the desired effect. The term "therapeutically effective amount" therefore refers to an amount of modified T cells (e.g., activated CAR T cells) that is sufficient to provide a particular anti-disease or condition effect when administered to a typical subject. An effective amount as used herein, in various contexts, would also include an amount sufficient to delay the development of a symptom of the disease, alter the course of a symptom disease (for example, but not limited to, slowing the progression of a disease or condition), or reverse a symptom of the condition. Thus, it is not generally practicable to specify an exact "effective amount." However, for any given case, an appropriate "effective amount" can be determined by one of ordinary skill in the art using only routine experimentation.

Effective amounts, toxicity, and therapeutic efficacy can be evaluated by standard pharmaceutical procedures in cell cultures or experimental animals. The dosage can vary depending upon the dosage form employed and the route of administration utilized. The dose ratio between toxic and therapeutic effects is the therapeutic index and can be expressed as the ratio LD50/ED50. Compositions and methods that exhibit large therapeutic indices are preferred. A therapeutically effective dose can be estimated initially from cell culture assays. Also, a dose can be formulated in animal models to achieve a circulating plasma concentration range that includes the IC50 (i.e., the concentration of modified T cells, which achieves a half-maximal inhibition of symptoms) as determined in cell culture, or in an appropriate animal model. Levels in plasma can be measured, for example, by high performance liquid chromatography. The effects of any particular dosage can be monitored by a suitable bioassay, e.g., assay for bone marrow testing, among others. The dosage can be determined by a physician and adjusted, as necessary, to suit observed effects of the treatment.

In one aspect, the technology described herein relates to pharmaceutical compositions comprising modified T cells as described herein, and optionally a pharmaceutically acceptable carrier. The active ingredients of the pharmaceutical composition at a minimum comprise modified T cells as described herein. In some embodiments, the active ingredients of the pharmaceutical composition consist essentially of modified T cells as described herein. In some embodiments, the active ingredients of the pharmaceutical composition consist of modified T cells as described herein. Pharmaceutically acceptable carriers for cell-based therapeutic formulation include saline and aqueous buffer solutions, Ringer's solution, and serum component, such as serum albumin, HDL, and LDL. The terms such as "excipient," "carrier," "pharmaceutically acceptable carrier," or the like are used interchangeably herein.

In some embodiments, the pharmaceutical composition comprising modified T cells as described herein can be a parenteral dose form. Since administration of parenteral dosage forms typically bypasses the patient's natural defenses against contaminants, the components apart from the modified T cells themselves are preferably sterile or capable of being sterilized prior to administration to a patient. Examples of parenteral dosage forms include, but are not limited to, solutions ready for injection, dry products ready to be dissolved or suspended in a pharmaceutically acceptable vehicle for injection, suspensions ready for injection, and emulsions. Any of these can be added to the modified T cell preparations prior to administration.

Suitable vehicles that can be used to provide parenteral dosage forms of modified T cells as disclosed herein are well known to those skilled in the art. Examples include, without limitation: saline solution; glucose solution; aqueous vehicles including but not limited to, sodium chloride injection, Ringer's injection, dextrose Injection, dextrose and sodium chloride injection, and lactated Ringer's injection; water-miscible vehicles such as, but not limited to, ethyl alcohol, polyethylene glycol, and propylene glycol; and non-aqueous vehicles such as, but not limited to, corn oil, cottonseed oil, peanut oil, sesame oil, ethyl oleate, isopropyl myristate, and benzyl benzoate.

The invention further includes kits for use in carrying out the methods of the invention. The kits can thus optionally include one or more reagents for making the modified T cells (e.g., nucleic acid molecules and/or enzymes used to carry out the deletions and/or additions of genetic sequences). The kits can further include the "universal" T cells generated by the methods of the invention, which can be used as an "of the shelf" source of therapeutic materials for patient treatment. The kits can further include instruments or devices that can be used to administer the modified T cells, as well as, optionally, directions for use of the compositions and methods of the invention.

Dosage

"Unit dosage form" as the term is used herein refers to a dosage for suitable one administration. By way of example a unit dosage form can be an amount of therapeutic disposed in a delivery device, e.g., a syringe or intravenous drip bag. In one embodiment, a unit dosage form is administered in a single administration. In another, embodiment more than one unit dosage form can be administered simultaneously.

In some embodiments, the modified T cells described herein are administered as a monotherapy, i.e., another treatment for the condition is not concurrently administered to the subject.

A pharmaceutical composition comprising the modified T cells described herein can generally be administered at a dosage of $10^4$ to $10^9$ cells/kg body weight, in some instances $10^5$ to $10^6$ cells/kg body weight, including all integer values within those ranges. If necessary, the modified T cell compositions can also be administered multiple times at these dosages. The cells can be administered by using infusion techniques that are commonly known in immunotherapy (see, e.g., Rosenberg et al., New Eng. J. of Med. 319:1676, 1988).

In certain aspects, it may be desired to administer modified T cells to a subject and then subsequently redraw blood (or have an apheresis performed), activate T cells therefrom as described herein, and reinfuse the patient with these activated and expanded T cells. This process can be carried out multiple times every few weeks. In certain aspects, T cells can be activated from blood draws of from 10 cc to 400 cc. In certain aspects, T cells are activated from blood draws of 20 cc, 30 cc, 40 cc, 50 cc, 60 cc, 70 cc, 80 cc, 90 cc, or 100 cc.

Modes of administration can include, for example, intravenous (i.v.) injection or infusion. The compositions described herein can be administered to a patient transarterially, intratumorally, intranodally, or intramedullary. In some embodiments, the compositions of modified T cells may be injected directly into a tumor, lymph node, or site of infection. In one embodiment, the compositions described herein are administered into a body cavity or body fluid (e.g., ascites, pleural fluid, peritoneal fluid, or cerebrospinal fluid).

In a particular exemplary aspect, and as described above, subjects may undergo leukapheresis, wherein leukocytes are collected, enriched, or depleted ex vivo to select and/or isolate the cells of interest, e.g., T cells. This process can include standard methods, e.g., stimulation by the use of magnetic beads coated with antibodies against CD3 and CD28. Alternatively, the T cells can be expanded by contact with an artificial antigen presenting cell (aAPC). These cells are engineered to express chimeric stimulatory receptors (CSRs) and, optionally, the cells are modified by knockdown or inactivation of low density lipoprotein receptor (LDLR) expression. The CSRs each comprise (i) an antibody reagent or natural ligand for a T cell co-stimulatory receptor (e.g., CD3, CD28, OX40, or 4-1BB, among others) or a T cell receptor; (ii) a linker domain, and (iii) a transmembrane domain. In one example, an aAPC is engineered to express CSRs against CD3 and CD28. Antibody reagents, linker domains, and transmembrane domains are, e.g., as described elsewhere herein. Cells that can be used to make aAPCs include, e.g., human cells, such as, e.g., erythromyeloid cells (e.g., K562 cells), myeloid cells, or cells engineered to lack HLA expression or functional HLA. Thus, T cell isolates can be expanded by contact with an aAPC as described herein (e.g., an aAPC expressing anti-CD28 and anti-CD3 CDRs as described herein) and treated such that one or more CAR constructs of the technology may be introduced, thereby creating a CAR T cell. Subjects in need thereof can subsequently undergo standard treatment with high dose chemotherapy followed by peripheral blood stem cell transplantation. Following or concurrent with the transplant, subjects can receive an infusion of the expanded CAR T cells. In one embodiment, expanded cells are administered before or following surgery.

In some embodiments, lymphodepletion is performed on a subject prior to administering one or more modified T cell as described herein. In such embodiments, the lymphodepletion can comprise administering one or more of melphalan, cytoxan, cyclophosphamide, and fludarabine.

The dosage of the above treatments to be administered to a patient will vary with the precise nature of the condition being treated and the recipient of the treatment. The scaling of dosages for human administration can be performed according to art-accepted practices.

In some embodiments, a single treatment regimen is required. In others, administration of one or more subsequent doses or treatment regimens can be performed. For example, after treatment biweekly for three months, treatment can be repeated once per month, for six months or a year or longer. In some embodiments, no additional treatments are administered following the initial treatment.

The dosage of a composition as described herein can be determined by a physician and adjusted, as necessary, to suit observed effects of the treatment. With respect to duration and frequency of treatment, it is typical for skilled clinicians to monitor subjects in order to determine when the treatment is providing therapeutic benefit, and to determine whether to administer further cells, discontinue treatment, resume treatment, or make other alterations to the treatment regimen. The dosage should not be so large as to cause adverse side effects, such as cytokine release syndrome. Generally, the dosage will vary with the age, condition, and sex of the patient and can be determined by one of skill in the art. The dosage can also be adjusted by the individual physician in the event of any complication.

Combination Therapy

The modified T cells (e.g., activated CAR T cells) described herein can be used in combination with other known agents and therapies. Administered "in combination," as used herein, means that two (or more) different treatments are delivered to the subject during the course of the subject's affliction with the disorder (e.g., disease or condition), e.g., the two or more treatments are delivered after the subject has been diagnosed with the disorder and before the disorder has been cured or eliminated or treatment has ceased for other reasons. In some embodiments, the delivery of one treatment is still occurring when the delivery of the second begins, so that there is overlap in terms of administration. This is sometimes referred to herein as "simultaneous" or "concurrent delivery." In other embodiments, the delivery of one treatment ends before the delivery of the other treatment begins. In some embodiments of either case, the treatment is more effective because of combined administration. For example, the second treatment is more effective, e.g., an equivalent effect is seen with less of the second treatment, or the second treatment reduces symptoms to a greater extent, than would be seen if the second treatment were administered in the absence of the first treatment, or the analogous situation is seen with the first treatment. In some embodiments, delivery is such that the reduction in a symptom, or other parameter related to the disorder is greater than what would be observed with one treatment delivered in the absence of the other. The effect of the two treatments can be partially additive, wholly additive, or greater than additive. The delivery can be such that an effect of the first treatment delivered is still detectable when the second is delivered. The modified T cells (e.g., activated CAR T cells) described herein and the at least one additional therapeutic agent can be administered simultaneously, in the same or in separate compositions, or sequentially. For sequential administration, the modified T cells (e.g., CAR-expressing cells) can be administered first, and the additional agent can be administered second, or the order of administration can be reversed. The CAR T therapy and/or other therapeutic agents, procedures, or modalities can be administered during periods of active disorder, or during a period of remission or less active disease. The modified T cell therapy can be administered before another treatment, concurrently with the treatment, post-treatment, or during remission of the disorder.

When administered in combination, the modified T cells and the additional agent (e.g., second or third agent), or all, can be administered in an amount or dose that is higher, lower, or the same as the amount or dosage of each agent used individually, e.g., as a monotherapy. In certain embodiments, the administered amount or dosage of the modified T cells, the additional agent (e.g., second or third agent), or all, is lower (e.g., at least 20%, at least 30%, at least 40%, or at least 50%) than the amount or dosage of each agent used individually. In other embodiments, the amount or dosage of the modified T cells, the additional agent (e.g., second or third agent), or all, that results in a desired effect (e.g., treatment of cancer) is lower (e.g., at least 20%, at least 30%, at least 40%, or at least 50% lower) than the amount or dosage of each agent individually required to achieve the same therapeutic effect. In further embodiments, the modified T cells described herein can be used in a treatment regimen in combination with surgery, chemotherapy, radiation, an mTOR pathway inhibitor, immunosuppressive agents, such as cyclosporin, azathioprine, methotrexate, mycophenolate, and FK506, antibodies, or other immunoablative agents such as CAMPATH, anti-CD3 antibodies or other antibody therapies, cytoxin, fludarabine, rapamycin, mycophenolic acid, steroids, FR901228, cytokines, or a peptide vaccine, such as that described in Izumoto et al., J. Neurosurg. 108:963-971, 2008.

In one embodiment, the modified T cells described herein can be used in combination with a checkpoint inhibitor. Exemplary checkpoint inhibitors include anti-PD-1 inhibitors (Nivolumab, MK-3475, Pembrolizumas, Pidilizumab, AMP-224, AMP-514), anti-CTLA4 inhibitors (Ipilimumab and Tremelimumab), anti-PDL1 inhibitors (Atezolizumab, Avelomab, MSB0010718C, MEDI4736, and MPDL3280A), and anti-TIM3 inhibitors.

In one embodiment, the modified T cells described herein can be used in combination with a chemotherapeutic agent. Exemplary chemotherapeutic agents include an anthracycline (e.g., doxorubicin (e.g., liposomal doxorubicin)), a vinca alkaloid (e.g., vinblastine, vincristine, vindesine, vinorelbine), an alkylating agent (e.g., cyclophosphamide, decarbazine, melphalan, ifosfamide, temozolomide), an immune cell antibody (e.g., alemtuzamab, gemtuzumab, rituximab, tositumomab), an antimetabolite (including, e.g., folic acid antagonists, pyrimidine analogs, purine analogs and adenosine deaminase inhibitors (e.g., fludarabine)), an mTOR inhibitor, a TNFR glucocorticoid induced TNFR related protein (GITR) agonist, a proteasome inhibitor (e.g., aclacinomycin A, gliotoxin or bortezomib), an immunomodulator such as thalidomide or a thalidomide derivative (e.g., lenalidomide). General chemotherapeutic agents considered for use in combination therapies include anastrozole (Arimidex®), bicalutamide (Casodex®), bleomycin sulfate (Blenoxane®), busulfan (Myleran®), busulfan injection (Busulfex®), capecitabine (Xeloda®), N4-pentoxycarbonyl-5-deoxy-5-fluorocytidine, carboplatin (Paraplatin®), carmustine (BiCNU®), chlorambucil (Leukeran®), cisplatin (Platinol®), cladribine (Leustatin®), cyclophosphamide (Cytoxan® or Neosar®), cytarabine, cytosine arabinoside (Cytosar-U®), cytarabine liposome injection (DepoCyt®), dacarbazine (DTIC-Dome®), dactinomycin (Actinomycin D, Cosmegan), daunorubicin hydrochloride (Cerubidine®), daunorubicin citrate liposome injection (DaunoXome®), dexamethasone, docetaxel (Taxotere®), doxorubicin hydrochloride (Adriamycin®, Rubex®), etoposide (Vepesid®), fludarabine phosphate (Fludara®), 5-fluorouracil (Adrucil®, Efudex®), flutamide (Eulexin®), tezacitibine, Gemcitabine (difluorodeoxycitidine), hydroxyurea (Hydrea®), Idarubicin (Idamycin®), ifosfamide (IFEX®), irinotecan (Camptosar®), L-asparaginase (ELSPAR®), leucovorin calcium, melphalan (Alkeran®), 6-mercaptopurine (Purinethol®), methotrexate (Folex®), mitoxantrone (Novantrone®), mylotarg, paclitaxel (Taxol®), phoenix (Yttrium90/MX-DTPA), pentostatin, polifeprosan 20 with carmustine implant (Gliadel®), tamoxifen citrate (Nolvadex®), teniposide (Vumon®), 6-thioguanine, thiotepa, tirapazamine (Tirazone®), topotecan hydrochloride for injection (Hycamptin®), vinblastine (Velban®), vincristine (Oncovin®), and vinorelbine (Navelbine®). Exemplary alkylating agents include, without limitation, nitrogen mustards, ethylenimine derivatives, alkyl sulfonates, nitrosoureas, and triazenes): uracil mustard (Aminouracil Mustard®, Chlorethaminacil®, Demethyldopan®, Desmethyldopan®, Haemanthamine®, Nordopan®, Uracil nitrogen Mustard®, Uracillost®, Uracilmostaza®, Uramustin®, Uramustine®), chlormethine (Mustargen®), cyclophosphamide (Cytoxan®), Neosar®, Clafen®, Endoxan®, Procytox®, Revimmune™), ifosfamide (Mitoxana®), melphalan (Alkeran®), Chlorambucil (Leukeran®), pipobroman (Amedel®, Vercyte®), triethylenemelamine (Hemel®, Hexalen®, Hexastat®), triethylenethiophosphoramine, Temozolomide (Temodar®), thiotepa (Thioplex®), busulfan (Busilvex®, Myleran®), carmustine (BICNU®), lomustine (CeeNU®), streptozocin (Zanosar®), and Dacarbazine (DTIC-Dome®). Additional exemplary alkylating agents include, without limitation, Oxaliplatin (Eloxatin®); Temozolomide (Temodar® and Temodal®); Dactinomycin (also known as actinomycin-D, Cosmegen®); Melphalan (also known as L-PAM, L-sarcolysin, and phenylalanine mustard, Alkeran®); Altretamine (also known as hexamethylmelamine (HMM), Hexalen®); Carmustine (BiCNU®); Bendamustine (Treanda®); Busulfan (Busulfex® and Myleran®); Carboplatin (Paraplatin®); Lomustine (also known as CCNU, CeeNU®); Cisplatin (also known as CDDP, Platinol® and Platinol®-AQ); Chlorambucil (Leukeran®); Cyclophosphamide (Cytoxan® and Neosar®); Dacarbazine (also known as DTIC, DIC and imidazole carboxamide, DTIC-Dome®); Altretamine (also known as hexamethylmelamine (HMM), Hexalen®); Ifosfamide (Ifex®); Prednumustine; Procarbazine (Matulane®); Mechlorethamine (also known as nitrogen mustard, mustine and mechloroethamine hydrochloride, Mustargen®); Streptozocin (Zanosar®); Thiotepa (also known as thiophosphoamide, TESPA and TSPA, Thioplex®); Cyclophosphamide (Endoxan®, Cytoxan®), Neosar®, Procytox®, Revimmune®); and Bendamustine HCl (Treanda®). Exemplary mTOR inhibitors include, e.g., temsirolimus; ridaforolimus (formally known as deferolimus, (IR,2R,45)-4-[(2R)-2 [(1R, 95,125,15R,16E,18R,19R,21R,235,24E,26E,28Z,305,325, 35R)-I, 18-dihydroxy-19,30-dimethoxy-15,17,21,23,29,35-hexamethyl-2,3,10,14,20-pentaoxo-| 1,36-dioxa-4-azatricyclo[30.3.1.04'9] hexatriaconta-16,24,26,28-tetraen-12-yl]propyl]-2-methoxycyclohexyl dimethylphosphinate, also known as AP23573 and MK8669, and described in PCT Publication No. WO 03/064383); everolimus (Afinitor® or RADOOI); rapamycin (AY22989, Sirolimus®); simapimod (CAS 164301-51-3); emsirolimus, (5-{2,4-Bis[(35,)-3-methylmorpholin-4-yl]pyrido[2,3-(i]pyrimidin-7-yl}-2-methoxyphenyl) methanol (AZD8055); 2-Amino-8-[iraw5,-4-(2-hydroxyethoxy)cyclohexyl]-6-(6-methoxy-3-pyridinyl)-4-methyl-pyrido[2,3-JJpyrimidin-7 (8H)-one (PF04691502, CAS 1013101-36-4); and N2-[1,4-dioxo-4-[4-(4-oxo-8-phenyl-4H-I-benzopyran-2-yl) morpholinium-4-yl]methoxy]butyl]-L-arginylglycyl-L-a-aspartyIL-serine-, inner salt (SF1126, CAS 936487-67-1), and XL765. Exemplary immunomodulators include, e.g., afutuzumab (available from Roche®); pegfilgrastim (Neulasta®); lenalidomide (CC-5013, Revlimid®); thalidomide (Thalomid®), actimid (CC4047); and IRX-2 (mixture of human cytokines including interleukin 1, interleukin 2, and interferon γ, CAS 951209-71-5, available from IRX Therapeutics). Exemplary anthracyclines include, e.g., doxorubicin (Adriamycin® and Rubex®); bleomycin (Ienoxane®); daunorubicin (dauorubicin hydrochloride, daunomycin, and rubidomycin hydrochloride, Cerubidine®); daunorubicin liposomal (daunorubicin citrate liposome, DaunoXome®); mitoxantrone (DHAD, Novantrone®); epirubicin (Ellence™); idarubicin (Idamycin®, Idamycin PFS®); mitomycin C (Mutamycin®); geldanamycin; herbimycin; ravidomycin; and desacetylravidomycin. Exemplary vinca alkaloids include, e.g., vinorelbine tartrate (Navelbine®), Vincristine (Oncovin®), and Vindesine (Eldisine®)); vinblastine (also known as vinblastine sulfate, vincaleukoblastine and VLB, Alkaban-AQ® and Velban®); and vinorelbine (Navelbine®). Exemplary proteosome inhibitors include bortezomib (Velcade®); carfilzomib (PX-171-007, (5)-4-Methyl-N-((5)-I-(((5)-4-methyl-I-((R)-2-methyloxiran-2-yl)-I-oxopentan-2-yl)amino)-I-oxo-3-phenylpropan-2-yl)-2-((5,)-2-(2-morpholinoacetamido)-4-phenylbutanamido)-pentanamide); marizomib (NPT0052); ixazomib citrate (MLN-9708); delanzomib (CEP-18770); and O-Methyl-N-[(2-methyl-5-thiazolyl) carbonyl]-L-seryl-O-methyl-N-[(IIS')-2-[(2R)-2-methyl-2-oxiranyl]-2-oxo-I-(phenylmethyl)ethyl]-L-serinamide (ONX-0912).

One of skill in the art can readily identify a chemotherapeutic agent of use (e.g., see Physicians' Cancer Chemotherapy Drug Manual 2014, Edward Chu, Vincent T. DeVita Jr., Jones & Bartlett Learning; Principles of Cancer Therapy, Chapter 85 in Harrison's Principles of Internal Medicine, 18th edition; Therapeutic Targeting of Cancer Cells: Era of Molecularly Targeted Agents and Cancer Pharmacology, Chs. 28-29 in Abeloff's Clinical Oncology, 2013 Elsevier; and Fischer D S (ed): The Cancer Chemotherapy Handbook, 4th ed. St. Louis, Mosby-Year Book, 2003).

In one example, the modified T cells described herein are administered to a subject in combination with a molecule that decreases the level and/or activity of a molecule targeting GITR and/or modulating GITR functions, a molecule that decreases the Treg cell population, an mTOR inhibitor, a GITR agonist, a kinase inhibitor, a non-receptor tyrosine kinase inhibitor, a CDK4 inhibitor, and/or a BTK inhibitor.

Efficacy

The efficacy of modified T cells (e.g., activated CAR T cells) in, e.g., the treatment of a condition described herein, or to induce a response as described herein (e.g., a reduction in cancer cells) can be determined by the skilled clinician. However, a treatment is considered "effective treatment," as the term is used herein, if one or more of the signs or symptoms of a condition described herein is altered in a beneficial manner, other clinically accepted symptoms are improved, or even ameliorated, or a desired response is induced, e.g., by at least 10% following treatment according to the methods described herein. Efficacy can be assessed, for example, by measuring a marker, indicator, symptom, and/or the incidence of a condition treated according to the methods described herein or any other measurable parameter appropriate. Treatment according to the methods described herein can reduce levels of a marker or symptom of a condition, e.g., by at least 10%, at least 15%, at least 20%, at least 25%, at least 30%, at least 40%, at least 50%, at least 60%, at least 70%, at least 80%, or at least 90% or more.

Efficacy can also be measured by a failure of an individual to worsen as assessed by hospitalization, or need for medical interventions (i.e., progression of the disease is halted). Methods of measuring these indicators are known to those of skill in the art and/or are described herein.

Treatment includes any treatment of a disease in an individual or an animal (some non-limiting examples include a human or an animal) and includes: (1) inhibiting the disease, e.g., preventing a worsening of symptoms (e.g., pain or inflammation); or (2) relieving the severity of the disease, e.g., causing regression of symptoms. An effective amount for the treatment of a disease means that amount which, when administered to a subject in need thereof, is sufficient to result in effective treatment as that term is defined herein, for that disease. Efficacy of an agent can be determined by assessing physical indicators of a condition or desired response. It is well within the ability of one skilled in the art to monitor efficacy of administration and/or treatment by measuring any one of such parameters, or any combination of parameters. Efficacy of a given approach can be assessed in animal models of a condition described herein, for example, treatment of ALL. When using an experimental animal model, efficacy of treatment is evidenced when a statistically significant change in a marker is observed.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior technology or for any other reason. All statements as to the date or representation as to the contents of these documents is based on the information available to the applicants and does not constitute any admission as to the correctness of the dates or contents of these documents.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The technology described herein is further illustrated by the following examples which in no way should be construed as being further limiting.

EXAMPLES

Example 1: Knock-Out of CD3ζ in Jurkat T Cells and Primary T Cells, and Transduction of CD3ζ Knock Out Cells with CARs To achieve gene knockout using CRISPR, guides were developed to target various coding sequences of CD3ζ, with the goal of CRISPR-mediated gene disruption by generation of insertions and/or deletions in the target genomic sequences, leading to frameshift mutations in the absence of expression.

Figure 2:
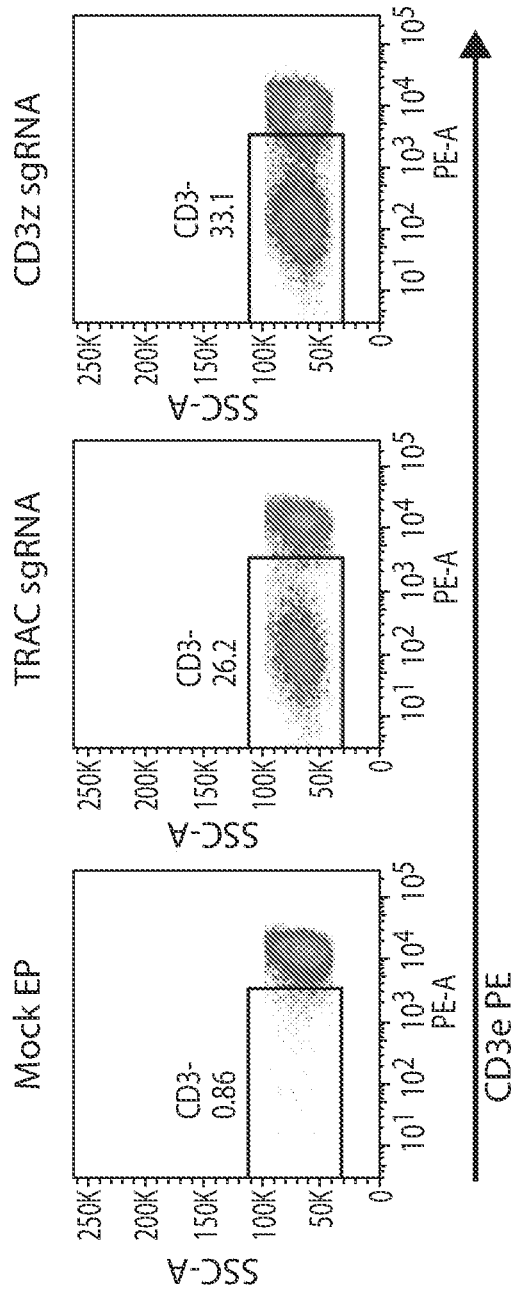
FIG. 2 shows the results of flow cytometry analysis of primary T cells in which CD3ζ or TRAC were knocked out using CRISPR.

CRISPR was used to knock out CD3ζ or T cell receptor alpha chain (TRAC) in Jurkat cells (FIG. 1). The two specific guide sequences used for CD3z KO are (i) CAGTTGCCGATTACAGGTA (SEQ ID NO: 15) and (ii) GTGGAAGGCGCTTTTCACCG (SEQ ID NO: 16). The resulting cells were analyzed by flow cytometry to show the effects of the knock outs on the expression of the CD3/T cell receptor complex. Both knock outs ablated expression of the CD3/T cell receptor in these cells, as compared to mock electroporated (EP) cells, and as determined by use of an anti-CD3e antibody day 7 post-EP. CRISPR was also used to knock out CD3ζ or TRAC in primary T cells (FIG. 2). Flow cytometry analysis day 8 post EP/day 12 post stimulation, using an anti-CD3e antibody, showed that the knock outs each ablate expression of the CD3/T cell receptor complex in these cells.

Figure 3:
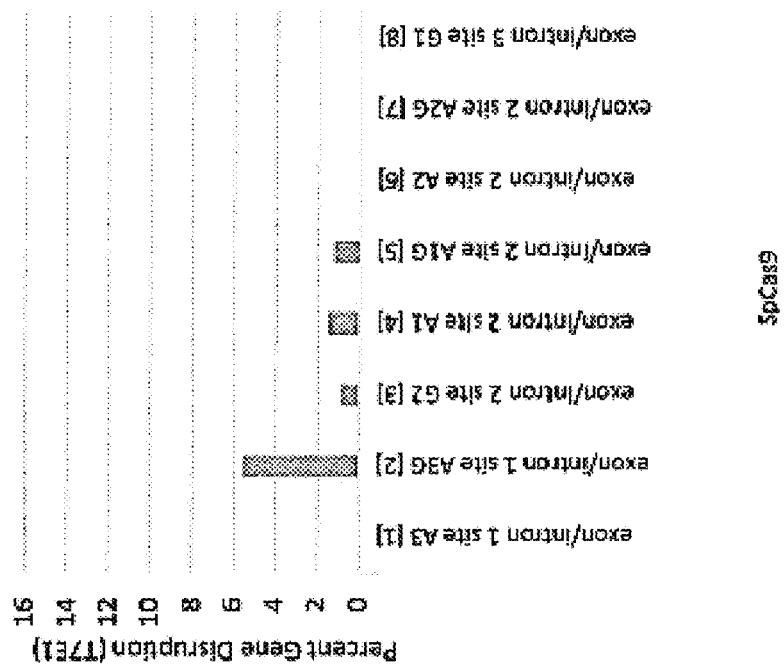
FIG. 3 shows the results of a T7E1 disruption assay testing the efficacy of various gRNAs directed against CD3ζ.

A T7E1 disruption assay using *S. pyogenes* Cas9 (SpCas9) was carried out to screen for percent gene disruption obtained using various gRNAs directed against CD3ζ (FIG. 3) in Jurkat T cell lines as well as primary human T cells. Maximal disruption was obtained using gRNA (2), which is directed against exon/intron 1 site and an additional guide GTGGAAGGCGCTTTTCACCG (SEQ ID NO: 16) which targets exon 1 of CD3z.

Figure 4:
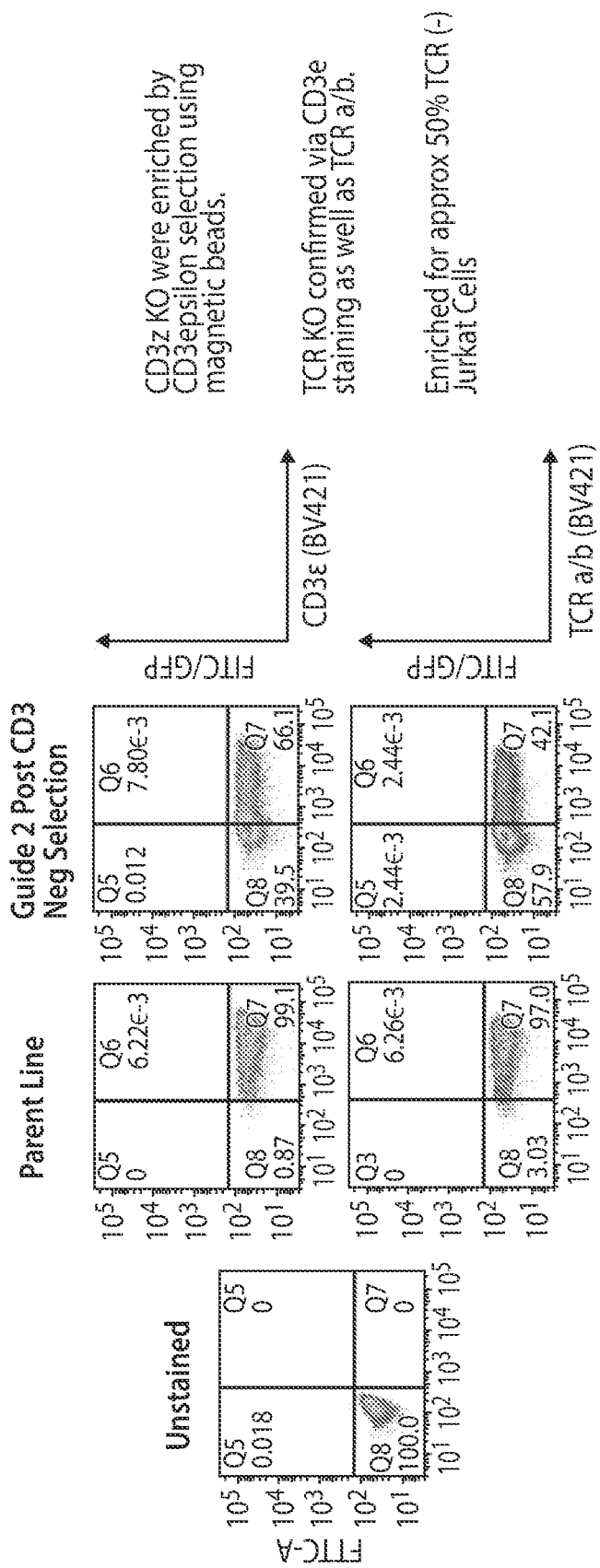
FIG. 4 shows the results of flow cytometry analysis of cells post CD3e negative selection.

Jurkat cells knocked out for CD3ζ by CRISPR using gRNA (2) were enriched by CD3e negative selection using magnetic beads (FIG. 4). T cell receptor knock out was confirmed by staining with antibodies against CD3e and TCR a/b. The negative selection enriched for approximately 50% TCR (−) cells.

Figure 5:
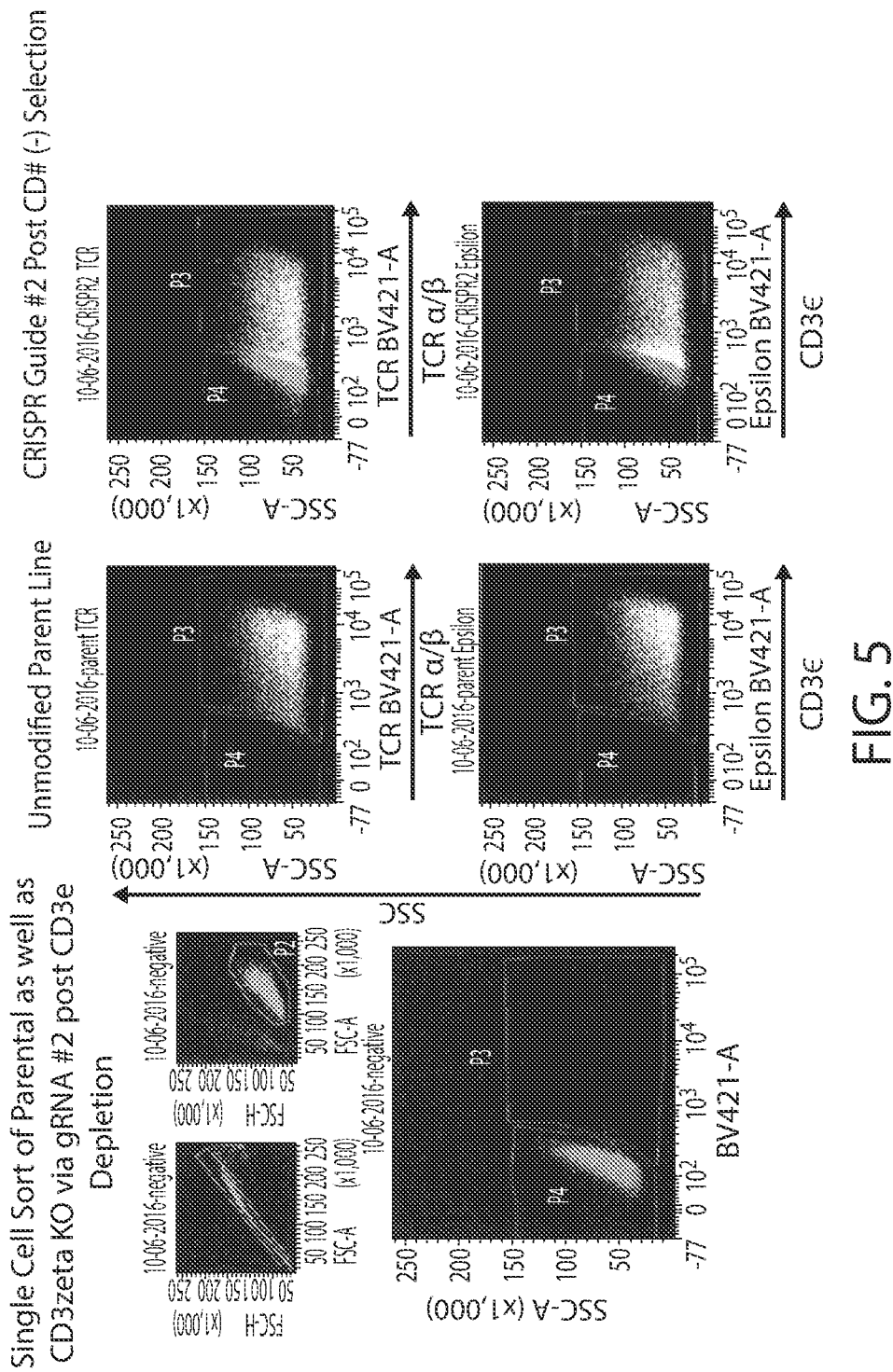
FIG. 5 shows the results of single cell sorting of parental Jurkat cells, as well as cells in which CD3ζ was knocked out using gRNA (2), post CD3e depletion.

Parental, unmodified Jurkat cells, as well as cells knocked out for CD3ζ using gRNA (2) and enriched for by negative selection for CD3e, were subjected to single cell sorting (FIG. 5). The results obtained using antibodies against TCR a/b and CD3e show that T cell receptor expression was ablated in these cells.

Figure 6:
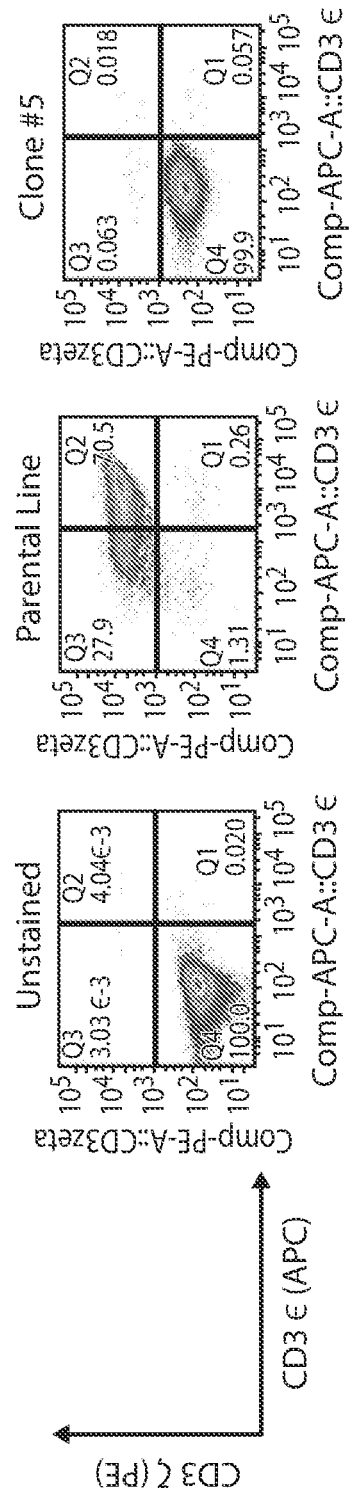
FIG. 6 shows the results of expansion of single cell clones post sorting.

Single cell clones (n=24) were expanded post sort and assessed for CD3ζ and CD3e staining (FIG. 6). Clone 5, which shows ablation of T cell receptor expression, as compared to parental control, was selected for use in functional assays.

Figure 7:
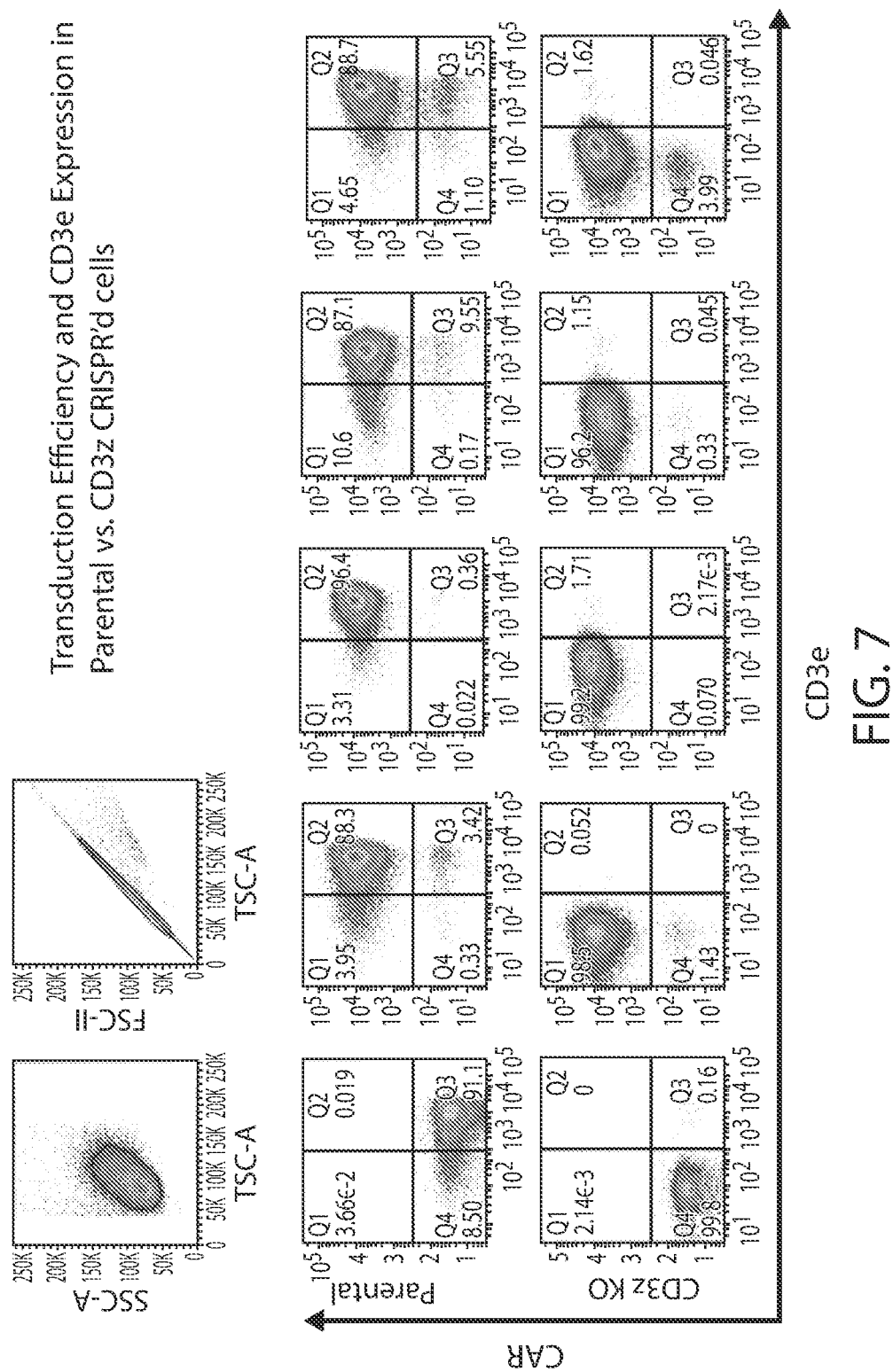
FIG. 7 shows the results of analysis of transduction efficiency of parental and CD3ζ knock out cells with CARs.

Parental, unmodified cells and cells knocked out for CD3ζ using CRISPR, as described above, were transduced with a vector encoding a various CAR directed against CD19 utilizing multiple intracellular signaling domains. Following transduction cells were analyzed for T cell receptor expression by means of CD3e in combination with various CAR constructs (FIG. 7).

Figure 8:
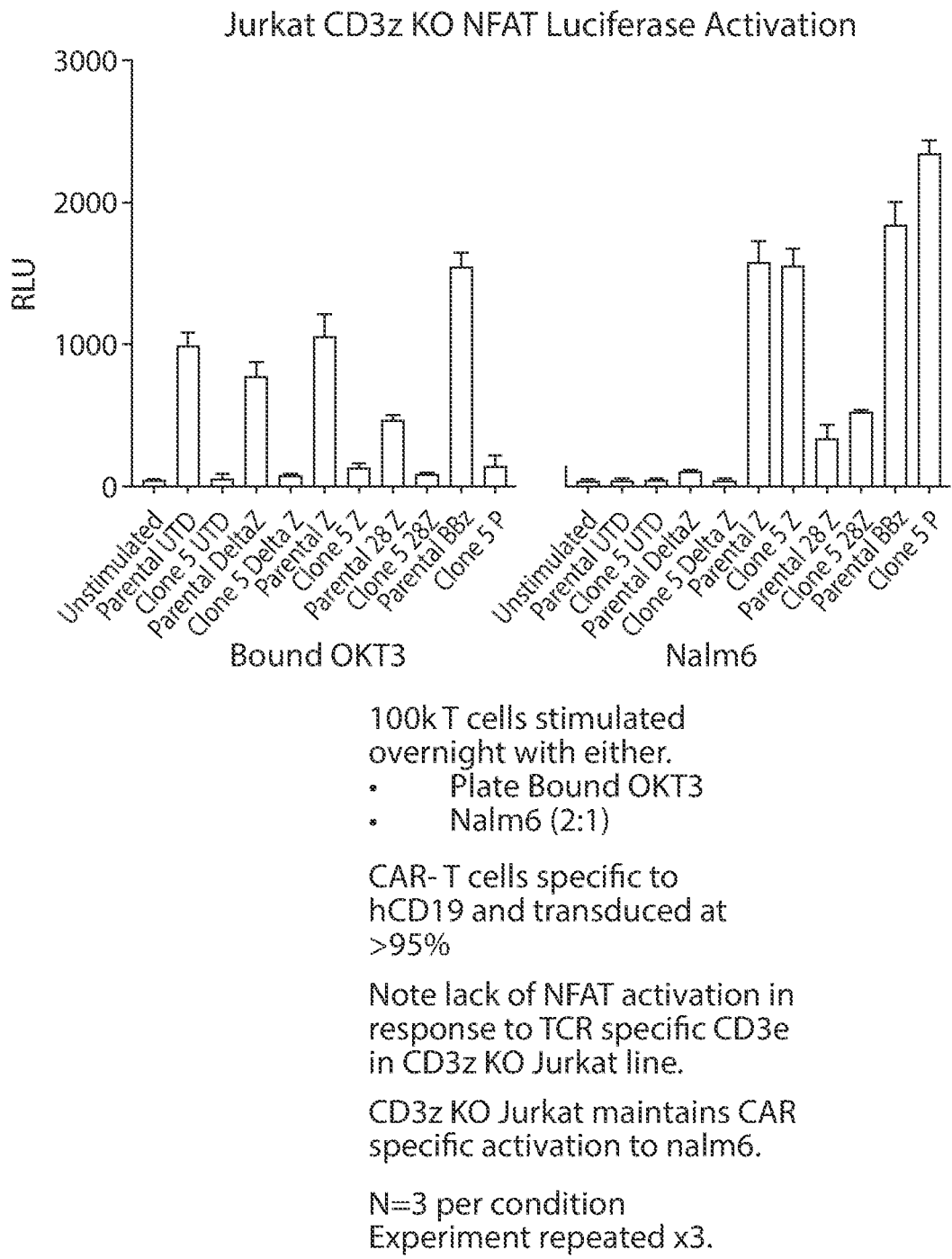
FIG. 8 shows the results of analysis of activation of CAR-transduced parental and CD3ζ knock out cells.

CD19 CAR transduced T cells were stimulated overnight with either plate bound OKT3 (anti-CD3) or Nalm6 (2:1) (FIG. 8). NFAT luciferase activation was assessed. The CAR-T cells were specific to hCD19 and were transduced at >95%. There was a lack of NFAT activation in response to TCR-specific CD3e in the CD3ζ knock out Jurkat line. However, the CD3ζ knock out Jurkat line maintains CAR specific activation to Nalm6. The experiment was repeated there times, with N=3 per condition.

Example 2: Modification of CD3ζ Knock Out T Cells to Reduce Rejection

Figure 9:
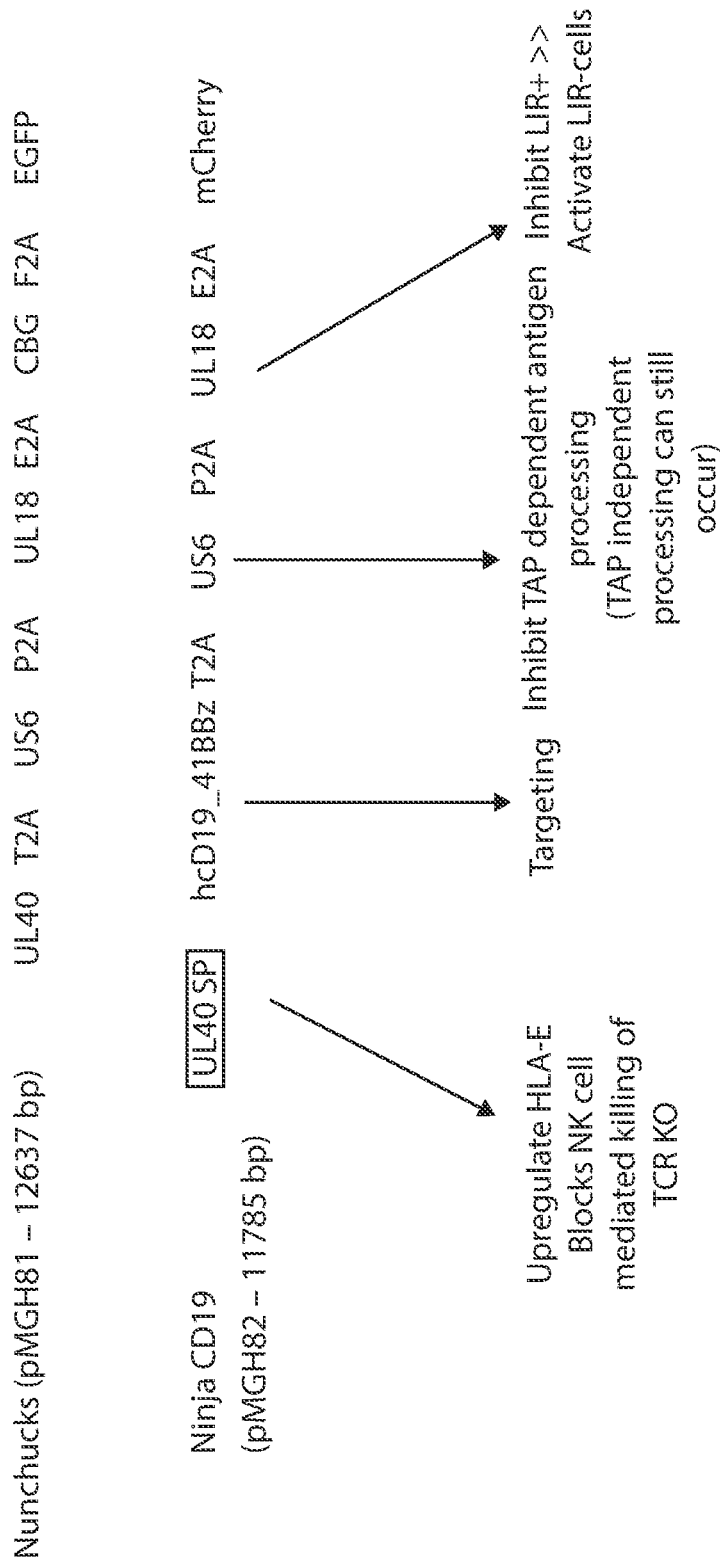
FIG. 9 is a schematic representation of vectors designated as Nunchucks (pMGH81) and Ninja (pMGH82), which can be used to modify T cells to express chimeric antigen receptors and heterologous proteins that decrease immune rejection.

Lentiviral vectors were constructed for use in transducing T cells (FIG. 9). Nunchucks (pMGH81) is a construct expressing 3 full length CMV proteins (UL40, US6, and UL18), click beetle green luciferase (CBG; to be used in cell killing assays and in vivo imaging), enhanced green fluorescent protein (EGFP; for downstream flow sorting), and viral 2A proteins (T2a, P2A, E2A, and F2A; for directing cleavage of the encoded polyprotein). The CMV proteins function to facilitate evasion of immune attack of a recipient to whom the T cells are administered, as explained above.

Ninja (pMGH82) is a construct expressing modified anti-human CD19_BBz chimeric antigen receptor, as well as CMV UL40 CMV viral protein and signal peptide. The signal peptide is loaded onto non-classical HLA-E which, when expressed, will help inhibit NK cell killing. CMV US6 and UL18 are also included, as well as mCherry, which is included as a reporter gene for transgene expression. Viral 2A elements (T2A, P2A, and E2A) are included to direct cleavage of the encoded polyprotein, as noted above.

Figure 10:
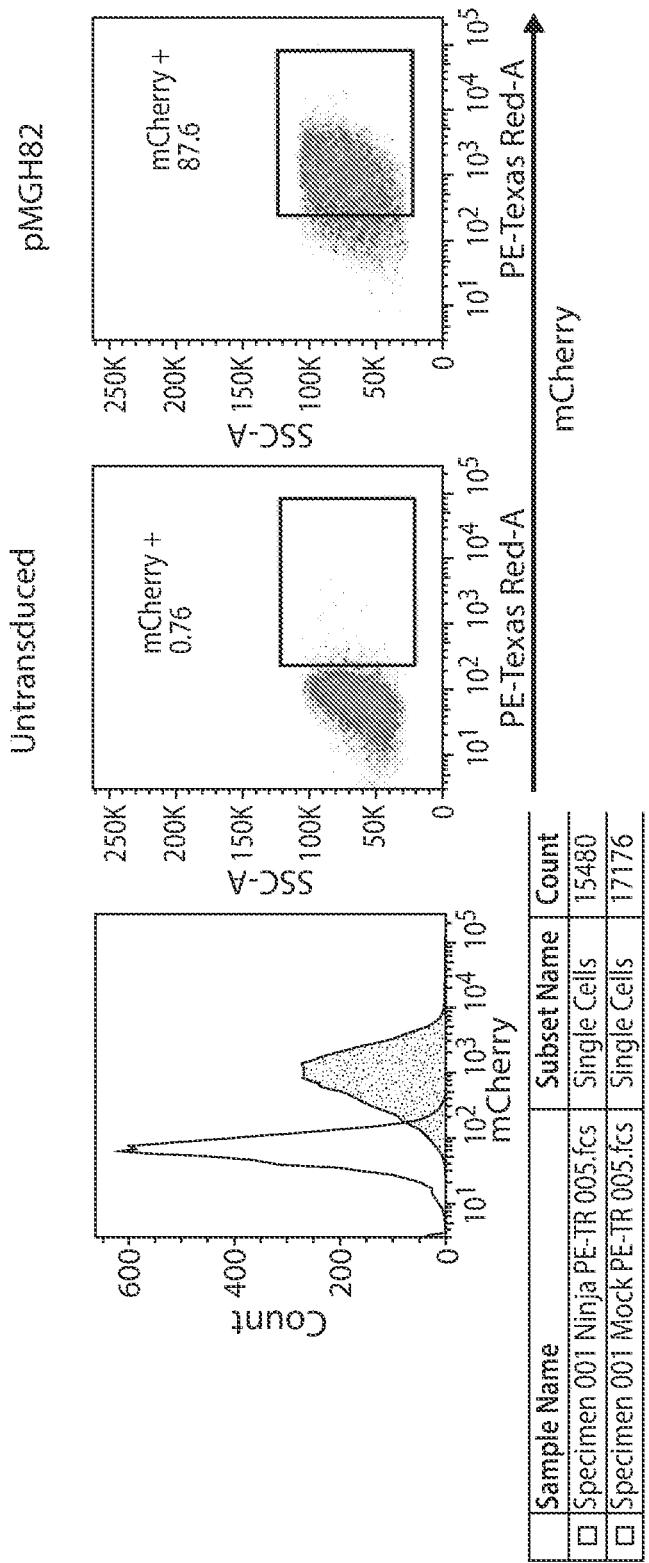
FIG. 10 shows the results of flow cytometry analysis of Jurkat T cells stably transduced with the Ninja vector (pMGH82).
Figure 11:
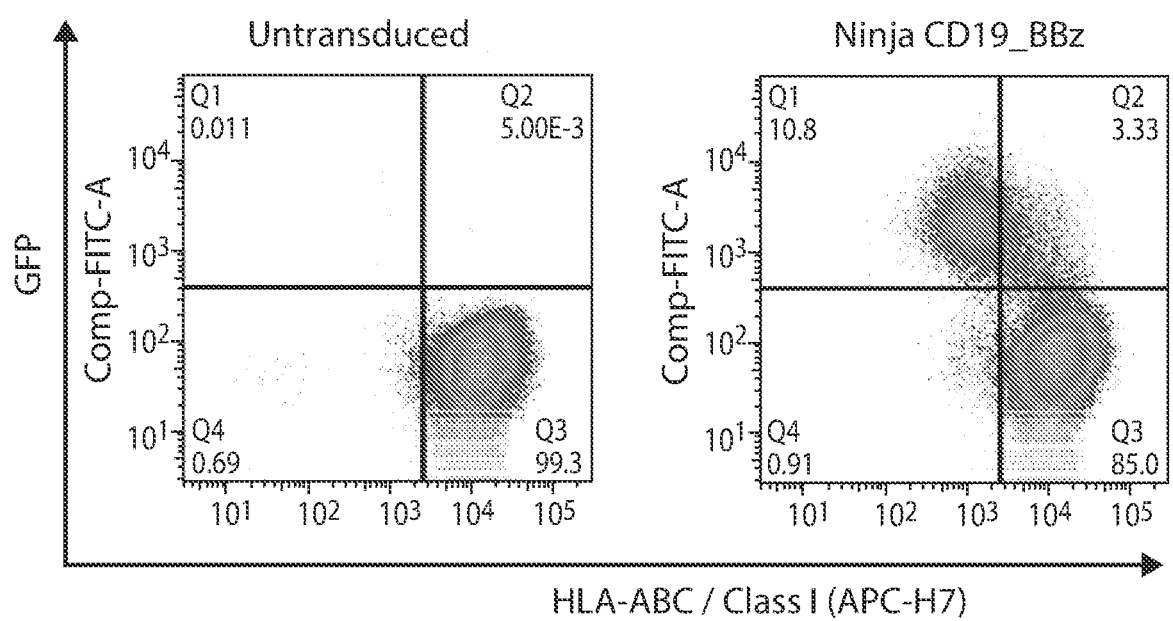
FIG. 11 shows the results of flow cytometry analysis of Raji tumor cells stably transduced with the Nunchucks vector (pMGH81).
Figure 12:
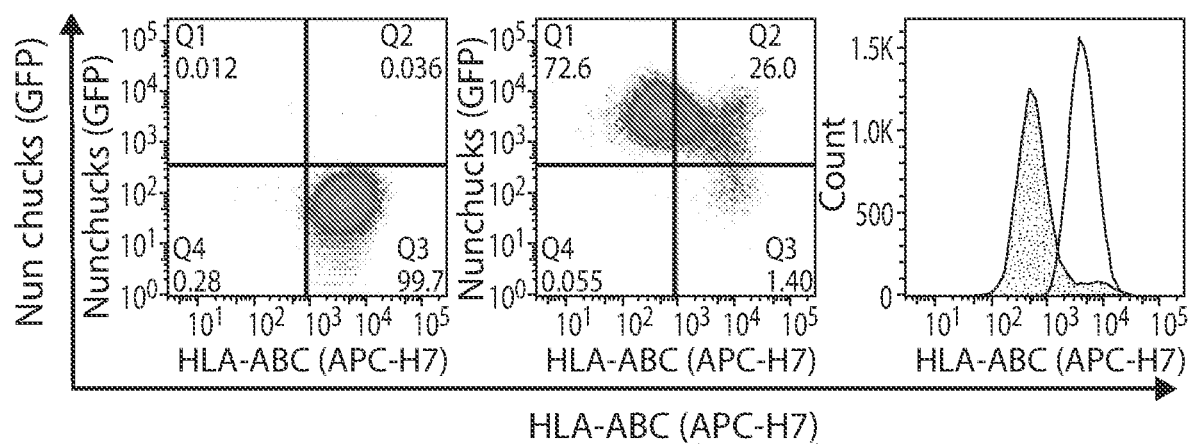
FIG. 12 shows the results of flow cytometry analysis of sorted Raji tumor cells stably transduced with the Nunchucks vector (pMGH81).

Jurkat and primary human T cells were transduced with virus encoded by the Ninja vector (FIG. 10). The data show that the encoded proteins are expressed in the cells. Raji tumor cell lines were transduced with virus encoded by the Nunchucks vector (pMGH81) (FIG. 11). Transgene positive Raji cells are labeled with GFP expressed from construct 2A elements. GFP (+) cells have decreased expression of HLA Class-I proteins, as shown in the GFP (+), HLA low/negative cell populations. Untransduced cells were used as a control. As discussed above, decreased HLA expression will protect allogeneic T cell products from being rejected by patients following allogeneic T cell product infusion. FIG. 12 shows that sorted Raji tumor cells expressing pMGH81 have decreased HLA Class I expression.

Figure 13:
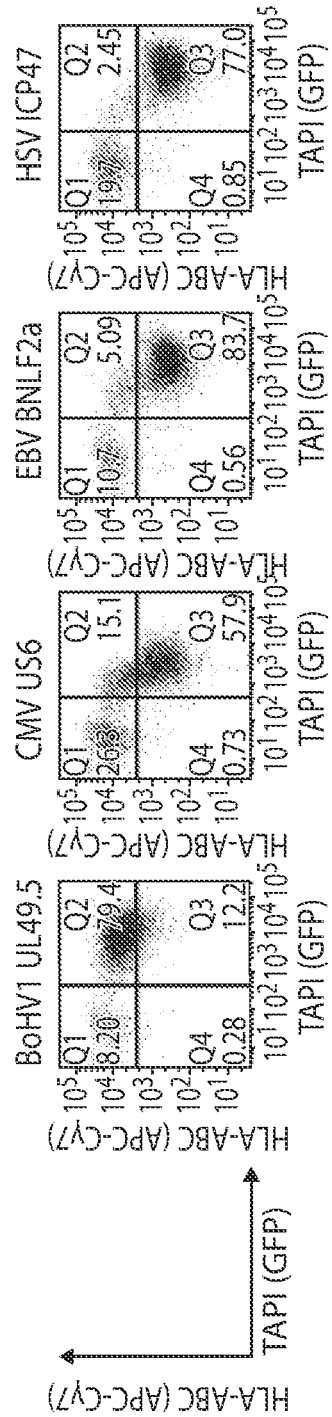
FIG. 13 shows the results of analysis of TAP inhibitor (BoHV1 UL49.5, CMV US6, EBV BNLF2a, and HSV ICP47) expression in primary human T cells on HLA class I.

FIG. 13 shows TAP inhibitor (BoHV1 UL49.5, CMV US6, EBV BNLF2a, and HSV ICP47) expression in primary human T cells and the resulting HLA class I downregulation/knock out. Transgene (GFP) positive=HLA-class I negative.

Example 3: Knock-Out of T Cell Receptor Alpha Chain (TRAC)

Figure 14:
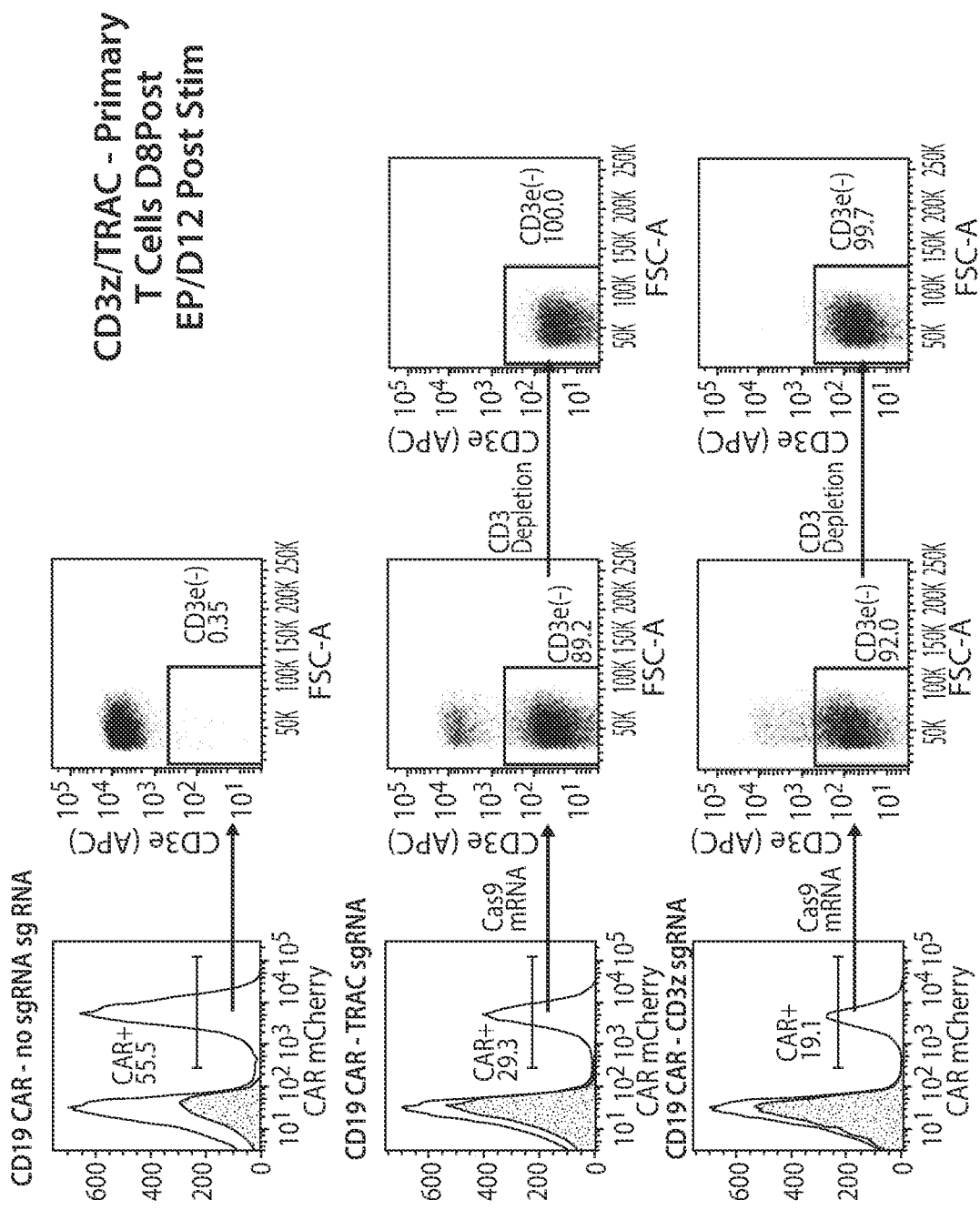
FIG. 14 shows the results of analysis of TRAC or CD3ζ knock out on the cell surface expression of the TCR in primary T cells.

TRAC was targeted using methods similar to those described above with respect to CD3ζ. The specific gRNA used for TRAC was AGAGTCTCTCAGCTGGTACA (SEQ ID NO: 17). As shown in FIG. 14, knock out of TRAC (AGAGTCTCTCAGCTGGTACA (SEQ ID NO: 17)) or CD3ζ(GTGGAAGGCGCTTTTCACCG (SEQ ID NO: 16)) in primary T cells, day 8 post electroporation/day 12 post stimulation, causes knock out of the cell surface expression of the TCR.

Various aspects of the invention are described in the following numbered paragraphs.

1. An isolated T lymphocyte modified to have reduced or eliminated expression of the T Cell Receptor (TCR), due to reduced or eliminated expression of a CD3ζ, T Cell Receptor Alpha Chain (TRAC), and/or T Cell Receptor Beta Chain (TRBC) gene.
2. The isolated T lymphocyte of paragraph 1, comprising a genome in which a CD3ζ, TRAC, and/or TRBC gene, regulatory sequence, coding sequence, exon, or a portion thereof, is mutated, resulting in reduced, null, or non-functional CD3ζ, CD3eta, CD3theta, TRAC, and/or TRBC expression.
3. The isolated T lymphocyte of paragraph 2, wherein the mutation is a deletion. The mutation can optionally be a frame shift mutation or deletion.
4. The isolated T lymphocyte of paragraph 2 or 3, wherein the mutation disrupts assembly of the T cell receptor or CD3ζ signaling.
5. The isolated T lymphocyte of any one of paragraphs 1-4, comprising a genome in which a CD3ζ, TRAC, and/or TRBC gene is deleted.
6. The isolated T lymphocyte of paragraph 5, comprising a genome in which two alleles of a CD3ζ, TRAC, and/or TRBC gene are deleted.
7. The isolated T lymphocyte of any one of paragraphs 1-6, wherein the reduced expression of the CD3ζ, TRAC, and/or TRBC gene is null expression.
8. The isolated T lymphocyte of any one of paragraphs 1-7, having reduced expression of CD3 eta or CD3 theta.
9. The isolated T lymphocyte of any one of paragraphs 1-8, wherein an HLA locus, or a portion thereof, is deleted.
10. The isolated T lymphocyte of paragraph 9, wherein the HLA locus is on chromosome 6.
11. The isolated T lymphocyte of any one of paragraphs 1-10, further having decreased HLA Class I expression.
12. The isolated T lymphocyte of any one of paragraphs 1-11, wherein the isolated T lymphocyte is further modified to express HLA-G.
13. The isolated T lymphocyte of any one of paragraphs 1-12, further comprising a gene encoding a heterologous protein that facilitates the T lymphocyte in evading immune attack from a host to whom the T lymphocyte is administered.
14. The isolated T lymphocyte of paragraph 13, wherein the heterologous protein facilitates evasion of T cell or NK mediated rejection.
15. The isolated T lymphocyte of paragraph 13 or 14, wherein the heterologous protein is a viral protein.
16. The isolated T lymphocyte of paragraph 15, wherein the viral protein is from a virus selected from the group consisting of cytomegalovirus (CMV), Epstein Barr virus (EBV), herpes simplex virus (HSV), and bovine herpes virus-1 (BoHV-1).
17. The isolated T lymphocyte of paragraph 16, wherein the viral protein is from CMV and is selected from the group consisting of US6, UL40, and UL18.
18. The isolated T lymphocyte of paragraph 16, wherein the viral protein inhibits transporter associated with antigen processing (TAP).
19. The isolated T lymphocyte of paragraph 18, wherein the viral protein is selected from the group consisting of CMV US6, HSV ICP47, BoHV-1 UL49.5, and EBV BNLF2a.
20. The isolated T lymphocyte of any one of paragraphs 1-19, further comprising a gene encoding a reporter gene.
21. The isolated T lymphocyte of paragraph 20, wherein the reporter gene comprises a truncated epidermal growth factor receptor (EGFR) gene, truncated prostate-specific membrane antigen (PSMA), truncated low affinity nerve growth factor receptor (LNGFR). truncated CD19.
22. The isolated T lymphocyte of any one of paragraphs 1-21, further comprising a gene encoding a therapeutic protein.
23. The isolated T lymphocyte of paragraph 22, wherein the therapeutic protein comprises an antigen receptor.
24. The isolated T lymphocyte of paragraph 23, wherein the antigen receptor confers specificity to a select target antigen.
25. The isolated T lymphocyte of paragraph 23, wherein the antigen receptor confers specificity to a select ligand.
26. The isolated T lymphocyte of paragraph 23, wherein the antigen receptor is a chimeric antigen receptor (CAR).

27. The isolated T lymphocyte of paragraph 26, wherein the CAR comprises an extracellular domain, a transmembrane region domain, and an intracellular region domain.
28. The isolated T lymphocyte of paragraph 27, wherein the extracellular domain comprises a single chain antibody and the intracellular domain comprises a T cell activating domain.
29. The isolated T lymphocyte of any one of paragraphs 1-28, further comprising a gene that induces cell death.
30. The isolated T lymphocyte of paragraph 29, wherein the gene is an activatable suicide gene.
31. The isolated T lymphocyte of paragraph 30, wherein the suicide gene is activated by a drug.
32. The isolated T lymphocyte of paragraph 31, wherein the suicide gene expresses an FK506 binding domain fused to a caspase9 pro-apoptotic molecule.
33. A method for producing a modified T lymphocyte, the method comprising inactivating a CD3ζ, TRAC, and/or TRBC gene in a T lymphocyte.
34. The method of paragraph 33, wherein the inactivation of the CD3ζ, TRAC, and/or TRBC gene is carried out using a nuclease or system selected from the group of zinc finger nucleases (ZFNs), transcription activator-like effector nucleases (TALENs), and the clustered regularly interspaced short palindromic repeats (CRISPR/cas9 system).
35. The method of paragraph 33 or 34, wherein the modified T lymphocyte is a modified T lymphocyte of any one of paragraphs 1-32.
36. A method of treating a subject for a disease, the method comprising administering to the subject an isolated T lymphocyte of any one of paragraphs 1-32.
37. The method of paragraph 36, wherein the disease is selected from the group consisting of cancer, an infectious disease, and an indication resulting from a transplantation procedure.
38. A method of reducing an immunogenic reaction in a subject, the method comprising administering to a subject a T lymphocyte according to any one of paragraphs 1-32.
39. The method of paragraph 38, wherein the T lymphocyte expresses a transgene.
40. The method of paragraph 38, wherein the T lymphocyte has reduced competition with endogenous T cell receptor signaling molecules.
41. The method of any one of paragraphs 36-40, wherein the T lymphocyte is autologous with respect to the subject.
42. The method of any one of paragraphs 36-40, wherein the T lymphocyte is allogeneic with respect to the subject.
43. The method of any one of paragraphs 36-42, wherein the modified T lymphocytes are expanded in vivo.
44. The method of any one of paragraphs 36-43, wherein the modified T lymphocytes are expanded in the subject's blood.
45. The method of any one of paragraphs 36-44, wherein the modified T lymphocytes are expanded in vitro, prior to administration.
46. A vector comprising a gene encoding a therapeutic protein and a heterologous protein that facilitates immune system evasion.
47. The vector of paragraph 46, wherein the heterologous protein is a viral protein.
48. The vector of paragraph 47, wherein the viral protein is from a virus selected from the group consisting of cytomegalovirus (CMV), Epstein Barr virus (EBV), herpes simplex virus (HSV), and bovine herpes virus-1 (BoHV-1).
49. The vector of paragraph 48, wherein the viral protein is from CMV and is selected from the group consisting of US6, UL40, and UL18.
50. The vector of paragraph 48, wherein the viral protein inhibits transporter associated with antigen processing (TAP).
51. The vector of paragraph 50, wherein the viral protein is selected from the group consisting of CMV US6, HSV ICP47, BoHV-1 UL49.5, and EBV BNLF2a.
52. The vector of any one of paragraphs paragraph 46-51, wherein the therapeutic protein is a CAR.
53. A method of transducing T lymphocytes with one or more of the vectors of paragraphs 46-52.
54. A modified T lymphocyte or cell line made according to the method of any one of paragraphs 33-35 or 53, or a subculture thereof.
55. A pharmaceutical composition comprising at least one modified T lymphocyte of any one of paragraphs 1-32.
56. A method of treating a subject comprising the steps of (a) preparing a population of modified T lymphocytes according to the method of any one of paragraphs 33-35 or 53, and (b) administering the modified T lymphocytes to the subject.
57. The method of paragraph 56, wherein the T lymphocytes originate from the subject to be treated.
58. The method of paragraph 56, wherein the T lymphocytes originate from a healthy donor.

What is claimed is:

1. An isolated T lymphocyte modified to have reduced or eliminated expression of the T Cell Receptor (TCR), due to reduced or eliminated expression of a CD3ζ, T Cell Receptor Alpha Chain (TRAC), or T Cell Receptor Beta Chain (TRBC) gene relative to a T lymphocyte without modification, wherein the isolated T lymphocyte expresses a protein comprising US6, UL40 viral protein and signal protein peptide, and UL18.

2. The isolated T lymphocyte of claim 1, comprising a genome in which a CD3ζ, TRAC, and/or TRBC gene, regulatory sequence, coding sequence, exon, or a portion thereof, is mutated, resulting in reduced, null, or non-functional CD3ζ, CD3eta, CD3theta, TRAC, or TRBC expression relative to a T lymphocyte without modification.

3. The isolated T lymphocyte of claim 2, wherein the mutation is a deletion or a frame shift mutation.

4. The isolated T lymphocyte of claim 2, wherein the mutation disrupts assembly of the T cell receptor or CD3ζ signaling.

5. The isolated T lymphocyte of claim 1, comprising a genome in which a CD3ζ, TRAC, TRBC gene is deleted.

6. The isolated T lymphocyte of claim 5, comprising a genome in which two alleles of a CD3ζ, TRAC, or TRBC gene are deleted.

7. The isolated T lymphocyte of claim 1, wherein the reduced expression of the CD3ζ, TRAC, or TRBC gene is null expression.

8. The isolated T lymphocyte of claim 1, wherein an HLA locus, or a portion thereof, is deleted.

9. The isolated T lymphocyte of claim 8, wherein the HLA locus is on chromosome 6.

10. The isolated T lymphocyte of claim 1, further having decreased HLA Class I expression relative to a T lymphocyte without modification.

11. The isolated T lymphocyte of claim 1, wherein the isolated T lymphocyte is further modified to express HLA-G.

12. The isolated T lymphocyte of claim 1, further comprising a gene encoding a heterologous protein that facilitates the T lymphocyte in evading immune attack from a host to whom the T lymphocyte is administered.

13. The isolated T lymphocyte of claim 12, wherein the heterologous protein facilitates evasion of T cell or NK mediated rejection.

14. The isolated T lymphocyte of claim 1, further comprising a gene encoding a therapeutic protein.

15. The isolated T lymphocyte of claim 1, further comprising a gene that induces cell death.

16. The isolated T lymphocyte of claim 1, wherein the T lymphocyte has reduced or eliminated expression of a CD3ζ relative to a T lymphocyte without modification.

17. The isolated T lymphocyte of claim 1, wherein the isolated T lymphocyte expresses full length US6, UL40 viral protein and signal peptide, and UL18 having 90% sequence identity respectively to SEQ ID NO: 1, 5, and 6.

* * * * *

UNITED STATES PATENT AND TRADEMARK OFFICE
CERTIFICATE OF CORRECTION

PATENT NO. : 12,459,975 B2
APPLICATION NO. : 16/476628
DATED : November 4, 2025
INVENTOR(S) : Marcela V. Maus et al.

Page 1 of 1

It is certified that error appears in the above-identified patent and that said Letters Patent is hereby corrected as shown below:

In the Claims

Column 57, Claim 1, Line 32, replace, "and signal protein peptide" with --and signal peptide--.

Signed and Sealed this
Sixth Day of January, 2026

John A. Squires
*Director of the United States Patent and Trademark Office*

SEQUENCE LISTING

```
<160> NUMBER OF SEQ ID NOS: 17

<210> SEQ ID NO 1
<211> LENGTH: 183
<212> TYPE: PRT
<213> ORGANISM: Artificial Sequence
<220> FEATURE:
<223> OTHER INFORMATION: Synthetic Construct

<400> SEQUENCE: 1

Met Asp Leu Leu Ile Arg Leu Gly Phe Leu Leu Met Cys Ala Leu Pro
1               5                   10                  15

Thr Pro Gly Glu Arg Ser Ser Arg Asp Pro Lys Thr Leu Leu Ser Leu
            20                  25                  30
```

Ser Pro Arg Gln Gln Ala Cys Val Pro Arg Thr Lys Ser His Arg Pro
            35                  40                  45

Val Cys Tyr Asn Asp Thr Gly Asp Cys Thr Asp Ala Asp Asp Ser Trp
 50                  55                  60

Lys Gln Leu Gly Glu Asp Phe Ala His Gln Cys Leu Gln Ala Ala Lys
 65                  70                  75                  80

Lys Arg Pro Lys Thr His Lys Ser Arg Pro Asn Asp Arg Asn Leu Glu
                    85                  90                  95

Gly Arg Leu Thr Cys Gln Arg Val Arg Arg Leu Leu Pro Cys Asp Leu
                100                 105                 110

Asp Ile His Pro Ser His Arg Leu Leu Thr Leu Met Asn Asn Cys Val
            115                 120                 125

Cys Asp Gly Ala Val Trp Asn Ala Phe Arg Leu Ile Glu Arg His Gly
130                 135                 140

Phe Phe Ala Val Thr Leu Tyr Leu Cys Cys Gly Ile Thr Leu Leu Val
145                 150                 155                 160

Val Ile Leu Ala Leu Leu Cys Ser Ile Thr Tyr Glu Ser Thr Gly Arg
                165                 170                 175

Gly Ile Arg Arg Cys Gly Ser
            180

<210> SEQ ID NO 2
<211> LENGTH: 88
<212> TYPE: PRT
<213> ORGANISM: Artificial Sequence
<220> FEATURE:
<223> OTHER INFORMATION: Synthetic Construct

<400> SEQUENCE: 2

Met Ser Trp Ala Leu Glu Met Ala Asp Thr Phe Leu Asp Thr Met Arg
 1               5                  10                  15

Val Gly Pro Arg Thr Tyr Ala Asp Val Arg Asp Glu Ile Asn Lys Arg
                20                  25                  30

Gly Arg Glu Asp Arg Glu Ala Ala Arg Thr Ala Val His Asp Pro Glu
            35                  40                  45

Arg Pro Leu Leu Arg Ser Pro Gly Leu Leu Pro Glu Ile Ala Pro Asn
 50                  55                  60

Ala Ser Leu Gly Val Ala His Arg Arg Thr Gly Gly Thr Val Thr Asp
 65                  70                  75                  80

Ser Pro Arg Asn Pro Val Thr Arg
                85

<210> SEQ ID NO 3
<211> LENGTH: 96
<212> TYPE: PRT
<213> ORGANISM: Artificial Sequence
<220> FEATURE:
<223> OTHER INFORMATION: Synthetic Construct

<400> SEQUENCE: 3

Met Pro Arg Ser Pro Leu Ile Val Ala Val Ala Ala Ala Leu Phe
 1               5                  10                  15

Ala Ile Val Arg Gly Arg Asp Pro Leu Leu Asp Ala Met Arg Arg Glu
                20                  25                  30

Gly Ala Met Asp Phe Trp Ser Ala Gly Cys Tyr Ala Arg Gly Val Pro
            35                  40                  45

Leu Ser Glu Pro Pro Gln Ala Leu Val Val Phe Tyr Val Ala Leu Thr

```
                50                  55                  60
Ala Val Met Val Ala Val Ala Leu Tyr Ala Tyr Gly Leu Cys Phe Arg
 65                  70                  75                  80

Leu Met Gly Ala Ser Gly Pro Asn Lys Lys Glu Ser Arg Gly Arg Gly
                 85                  90                  95

<210> SEQ ID NO 4
<211> LENGTH: 60
<212> TYPE: PRT
<213> ORGANISM: Artificial Sequence
<220> FEATURE:
<223> OTHER INFORMATION: Synthetic Construct

<400> SEQUENCE: 4

Met Val His Val Leu Glu Arg Ala Leu Leu Glu Gln Gln Ser Ser Ala
 1               5                   10                  15

Cys Gly Leu Pro Gly Ser Ser Thr Glu Thr Arg Pro Ser His Pro Cys
                20                  25                  30

Pro Glu Asp Pro Asp Val Ser Arg Leu Arg Leu Leu Val Val Leu
             35                  40                  45

Cys Val Leu Phe Gly Leu Leu Cys Leu Leu Leu Ile
         50                  55                  60

<210> SEQ ID NO 5
<211> LENGTH: 221
<212> TYPE: PRT
<213> ORGANISM: Artificial Sequence
<220> FEATURE:
<223> OTHER INFORMATION: Synthetic Construct

<400> SEQUENCE: 5

Met Asn Lys Phe Ser Asn Thr Arg Ile Gly Phe Thr Cys Ala Val Met
 1               5                   10                  15

Ala Pro Arg Thr Leu Ile Leu Thr Val Gly Leu Leu Cys Met Arg Ile
                20                  25                  30

Arg Ser Leu Leu Cys Ser Pro Ala Glu Thr Thr Val Thr Thr Ala Ala
             35                  40                  45

Val Thr Ser Ala His Gly Pro Leu Cys Pro Leu Val Phe Gln Gly Trp
         50                  55                  60

Ala Tyr Ala Val Tyr His Gln Gly Asp Met Ala Leu Met Thr Leu Asp
 65                  70                  75                  80

Val Tyr Cys Cys Arg Gln Thr Ser Asn Asn Thr Val Ala Phe Ser
                 85                  90                  95

His His Pro Ala Asp Asn Thr Leu Leu Ile Glu Val Gly Asn Asn Thr
            100                 105                 110

Arg Arg His Val Asp Gly Ile Ser Cys Gln Asp His Phe Arg Ala Gln
        115                 120                 125

His Gln Asp Cys Pro Ala Gln Thr Val His Val Arg Gly Val Asn Glu
    130                 135                 140

Ser Ala Phe Gly Leu Thr His Leu Gln Ser Cys Cys Leu Asn Glu His
145                 150                 155                 160

Ser Gln Leu Ser Glu Arg Val Ala Tyr His Leu Lys Leu Arg Pro Ala
                165                 170                 175

Thr Phe Gly Leu Glu Thr Trp Ala Met Tyr Thr Val Gly Ile Leu Ala
            180                 185                 190

Leu Gly Ser Phe Ser Ser Phe Tyr Ser Gln Ile Ala Arg Ser Leu Gly
        195                 200                 205
```

Val Leu Pro Asn Asp His His Tyr Ala Leu Lys Lys Ala
    210                 215                 220

<210> SEQ ID NO 6
<211> LENGTH: 368
<212> TYPE: PRT
<213> ORGANISM: Artificial Sequence
<220> FEATURE:
<223> OTHER INFORMATION: Synthetic Construct

<400> SEQUENCE: 6

Met Met Thr Met Trp Cys Leu Thr Leu Phe Val Leu Trp Met Leu Arg
1               5                   10                  15

Val Val Gly Met His Val Leu Arg Tyr Gly Tyr Thr Gly Ile Phe Asp
            20                  25                  30

Asp Thr Ser His Met Thr Leu Thr Val Val Gly Ile Phe Asp Gly Gln
        35                  40                  45

His Phe Phe Thr Tyr His Val Asn Ser Ser Asp Lys Ala Ser Ser Arg
    50                  55                  60

Ala Asn Gly Thr Ile Ser Trp Met Ala Asn Val Ser Ala Ala Tyr Pro
65                  70                  75                  80

Thr Tyr Leu Asp Gly Glu Arg Ala Lys Gly Asp Leu Ile Phe Asn Gln
                85                  90                  95

Thr Glu Gln Asn Leu Leu Glu Leu Glu Ile Ala Leu Gly Tyr Arg Ser
            100                 105                 110

Gln Ser Val Leu Thr Trp Thr His Glu Cys Asn Thr Thr Glu Asn Gly
        115                 120                 125

Ser Phe Val Ala Gly Tyr Glu Gly Phe Gly Trp Asp Gly Glu Thr Leu
    130                 135                 140

Met Glu Leu Lys Asp Asn Leu Thr Leu Trp Thr Gly Pro Asn Tyr Glu
145                 150                 155                 160

Ile Ser Trp Leu Lys Gln Asn Lys Thr Tyr Ile Asp Gly Lys Ile Lys
                165                 170                 175

Asn Ile Ser Glu Gly Asp Thr Thr Ile Gln Arg Asn Tyr Leu Lys Gly
            180                 185                 190

Asn Cys Thr Gln Trp Ser Val Ile Tyr Ser Gly Phe Gln Thr Pro Val
        195                 200                 205

Thr His Pro Val Val Lys Gly Gly Val Arg Asn Gln Asn Asp Asn Arg
    210                 215                 220

Ala Glu Ala Phe Cys Thr Ser Tyr Gly Phe Phe Pro Gly Glu Ile Asn
225                 230                 235                 240

Ile Thr Phe Ile His Tyr Gly Asn Lys Ala Pro Asp Asp Ser Glu Pro
                245                 250                 255

Gln Cys Asn Pro Leu Leu Pro Thr Phe Asp Gly Thr Phe His Gln Gly
            260                 265                 270

Cys Tyr Val Ala Ile Phe Cys Asn Gln Asn Tyr Thr Cys Arg Val Thr
        275                 280                 285

His Gly Asn Trp Thr Val Glu Ile Pro Ile Ser Val Thr Ser Pro Asp
    290                 295                 300

Asp Ser Ser Ser Gly Glu Val Pro Asp His Pro Thr Ala Asn Lys Arg
305                 310                 315                 320

Tyr Asn Thr Met Thr Ile Ser Ser Val Leu Leu Ala Leu Leu Leu Cys
                325                 330                 335

Ala Leu Leu Phe Ala Phe Leu His Tyr Phe Thr Thr Leu Lys Gln Tyr
            340                 345                 350

Leu Arg Asn Leu Ala Phe Ala Trp Arg Tyr Arg Lys Val Arg Ser Ser
        355                 360                 365

<210> SEQ ID NO 7
<211> LENGTH: 338
<212> TYPE: PRT
<213> ORGANISM: Artificial Sequence
<220> FEATURE:
<223> OTHER INFORMATION: Synthetic Construct

<400> SEQUENCE: 7

Met Val Val Met Ala Pro Arg Thr Leu Phe Leu Leu Leu Ser Gly Ala
1               5                   10                  15

Leu Thr Leu Thr Glu Thr Trp Ala Gly Ser His Ser Met Arg Tyr Phe
            20                  25                  30

Ser Ala Ala Val Ser Arg Pro Gly Arg Gly Glu Pro Arg Phe Ile Ala
        35                  40                  45

Met Gly Tyr Val Asp Asp Thr Gln Phe Val Arg Phe Asp Ser Asp Ser
    50                  55                  60

Ala Cys Pro Arg Met Glu Pro Arg Ala Pro Trp Val Glu Gln Glu Gly
65                  70                  75                  80

Pro Glu Tyr Trp Glu Glu Glu Thr Arg Asn Thr Lys Ala His Ala Gln
                85                  90                  95

Thr Asp Arg Met Asn Leu Gln Thr Leu Arg Gly Tyr Tyr Asn Gln Ser
            100                 105                 110

Glu Ala Ser Ser His Thr Leu Gln Trp Met Ile Gly Cys Asp Leu Gly
        115                 120                 125

Ser Asp Gly Arg Leu Leu Arg Gly Tyr Glu Gln Tyr Ala Tyr Asp Gly
    130                 135                 140

Lys Asp Tyr Leu Ala Leu Asn Glu Asp Leu Arg Ser Trp Thr Ala Ala
145                 150                 155                 160

Asp Thr Ala Ala Gln Ile Ser Lys Arg Lys Cys Glu Ala Ala Asn Val
                165                 170                 175

Ala Glu Gln Arg Arg Ala Tyr Leu Glu Gly Thr Cys Val Glu Trp Leu
            180                 185                 190

His Arg Tyr Leu Glu Asn Gly Lys Glu Met Leu Gln Arg Ala Asp Pro
        195                 200                 205

Pro Lys Thr His Val Thr His His Pro Val Phe Asp Tyr Glu Ala Thr
    210                 215                 220

Leu Arg Cys Trp Ala Leu Gly Phe Tyr Pro Ala Glu Ile Ile Leu Thr
225                 230                 235                 240

Trp Gln Arg Asp Gly Glu Asp Gln Thr Gln Asp Val Glu Leu Val Glu
                245                 250                 255

Thr Arg Pro Ala Gly Asp Gly Thr Phe Gln Lys Trp Ala Ala Val Val
            260                 265                 270

Val Pro Ser Gly Glu Glu Gln Arg Tyr Thr Cys His Val Gln His Glu
        275                 280                 285

Gly Leu Pro Glu Pro Leu Met Leu Arg Trp Lys Gln Ser Ser Leu Pro
    290                 295                 300

Thr Ile Pro Ile Met Gly Ile Val Ala Gly Leu Val Val Leu Ala Ala
305                 310                 315                 320

Val Val Thr Gly Ala Ala Val Ala Ala Val Leu Trp Arg Lys Lys Ser
                325                 330                 335

Ser Asp

<210> SEQ ID NO 8
<211> LENGTH: 358
<212> TYPE: PRT
<213> ORGANISM: Artificial Sequence
<220> FEATURE:
<223> OTHER INFORMATION: Synthetic Construct

<400> SEQUENCE: 8

```
Met Val Asp Gly Thr Leu Leu Leu Leu Ser Glu Ala Leu Ala Leu
1               5                   10                  15

Thr Gln Thr Trp Ala Gly Ser His Ser Leu Lys Tyr Phe His Thr Ser
            20                  25                  30

Val Ser Arg Pro Gly Arg Gly Glu Pro Arg Phe Ile Ser Val Gly Tyr
        35                  40                  45

Val Asp Asp Thr Gln Phe Val Arg Phe Asp Asn Asp Ala Ala Ser Pro
50                  55                  60

Arg Met Val Pro Arg Ala Pro Trp Met Glu Gln Glu Gly Ser Glu Tyr
65                  70                  75                  80

Trp Asp Arg Glu Thr Arg Ser Ala Arg Asp Thr Ala Gln Ile Phe Arg
                85                  90                  95

Val Asn Leu Arg Thr Leu Arg Gly Tyr Tyr Asn Gln Ser Glu Ala Gly
            100                 105                 110

Ser His Thr Leu Gln Trp Met His Gly Cys Glu Leu Gly Pro Asp Gly
        115                 120                 125

Arg Phe Leu Arg Gly Tyr Glu Gln Phe Ala Tyr Asp Gly Lys Asp Tyr
    130                 135                 140

Leu Thr Leu Asn Glu Asp Leu Arg Ser Trp Thr Ala Val Asp Thr Ala
145                 150                 155                 160

Ala Gln Ile Ser Glu Gln Lys Ser Asn Asp Ala Ser Glu Ala Glu His
                165                 170                 175

Gln Arg Ala Tyr Leu Glu Asp Thr Cys Val Glu Trp Leu His Lys Tyr
            180                 185                 190

Leu Glu Lys Gly Lys Glu Thr Leu Leu His Leu Glu Pro Pro Lys Thr
        195                 200                 205

His Val Thr His His Pro Ile Ser Asp His Glu Ala Thr Leu Arg Cys
    210                 215                 220

Trp Ala Leu Gly Phe Tyr Pro Ala Glu Ile Thr Leu Thr Trp Gln Gln
225                 230                 235                 240

Asp Gly Glu Gly His Thr Gln Asp Thr Glu Leu Val Glu Thr Arg Pro
                245                 250                 255

Ala Gly Asp Gly Thr Phe Gln Lys Trp Ala Ala Val Val Val Pro Ser
            260                 265                 270

Gly Glu Glu Gln Arg Tyr Thr Cys His Val Gln His Glu Gly Leu Pro
        275                 280                 285

Glu Pro Val Thr Leu Arg Trp Lys Pro Ala Ser Gln Pro Thr Ile Pro
    290                 295                 300

Ile Val Gly Ile Ile Ala Gly Leu Val Leu Gly Ser Val Val Ser
305                 310                 315                 320

Gly Ala Val Val Ala Ala Val Ile Trp Arg Lys Lys Ser Ser Gly Gly
                325                 330                 335

Lys Gly Gly Ser Tyr Ser Lys Ala Glu Trp Ser Asp Ser Ala Gln Gly
            340                 345                 350

Ser Glu Ser His Ser Leu
        355
```

<210> SEQ ID NO 9
<211> LENGTH: 112
<212> TYPE: PRT
<213> ORGANISM: Artificial Sequence
<220> FEATURE:
<223> OTHER INFORMATION: Synthetic Construct

<400> SEQUENCE: 9

```
Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110
```

<210> SEQ ID NO 10
<211> LENGTH: 112
<212> TYPE: PRT
<213> ORGANISM: Artificial Sequence
<220> FEATURE:
<223> OTHER INFORMATION: Synthetic Construct

<400> SEQUENCE: 10

```
Arg Val Lys Phe Ser Arg Ser Ala Asp Ala Pro Ala Tyr Gln Gln Gly
1               5                   10                  15

Gln Asn Gln Leu Phe Asn Glu Leu Asn Leu Gly Arg Arg Glu Glu Phe
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110
```

<210> SEQ ID NO 11
<211> LENGTH: 112
<212> TYPE: PRT
<213> ORGANISM: Artificial Sequence
<220> FEATURE:
<223> OTHER INFORMATION: Synthetic Construct

<400> SEQUENCE: 11

```
Arg Val Lys Phe Ser Arg Ser Ala Asp Ala Pro Ala Tyr Gln Gln Gly
1               5                   10                  15

Gln Asn Gln Leu Phe Asn Glu Leu Asn Leu Gly Arg Arg Glu Glu Phe
            20                  25                  30

Asp Val Leu Asp Lys Arg Arg Gly Arg Asp Pro Glu Met Gly Gly Lys
        35                  40                  45
```

```
Pro Arg Arg Lys Asn Pro Gln Glu Gly Leu Phe Asn Glu Leu Gln Lys
        50                  55                  60
Asp Lys Met Ala Glu Ala Phe Ser Glu Ile Gly Met Lys Gly Glu Arg
 65                  70                  75                  80
Arg Arg Gly Lys Gly His Asp Gly Leu Tyr Gln Gly Leu Ser Thr Ala
                85                  90                  95
Thr Lys Asp Thr Tyr Asp Ala Leu His Met Gln Ala Leu Pro Pro Arg
               100                 105                 110
```

<210> SEQ ID NO 12
<211> LENGTH: 112
<212> TYPE: PRT
<213> ORGANISM: Artificial Sequence
<220> FEATURE:
<223> OTHER INFORMATION: Synthetic Construct

<400> SEQUENCE: 12

```
Arg Val Lys Phe Ser Arg Ser Ala Asp Ala Pro Ala Tyr Gln Gln Gly
 1               5                  10                  15
Gln Asn Gln Leu Phe Asn Glu Leu Asn Leu Gly Arg Arg Glu Glu Phe
                20                  25                  30
Asp Val Leu Asp Lys Arg Arg Gly Arg Asp Pro Glu Met Gly Gly Lys
            35                  40                  45
Pro Arg Arg Lys Asn Pro Gln Glu Gly Leu Tyr Asn Glu Leu Gln Lys
        50                  55                  60
Asp Lys Met Ala Glu Ala Tyr Ser Glu Ile Gly Met Lys Gly Glu Arg
 65                  70                  75                  80
Arg Arg Gly Lys Gly His Asp Gly Leu Phe Gln Gly Leu Ser Thr Ala
                85                  90                  95
Thr Lys Asp Thr Phe Asp Ala Leu His Met Gln Ala Leu Pro Pro Arg
               100                 105                 110
```

<210> SEQ ID NO 13
<211> LENGTH: 23
<212> TYPE: DNA
<213> ORGANISM: Artificial Sequence
<220> FEATURE:
<223> OTHER INFORMATION: Synthetic Construct

<400> SEQUENCE: 13
acagttgccg attacaggta ggg                                   23

<210> SEQ ID NO 14
<211> LENGTH: 20
<212> TYPE: DNA
<213> ORGANISM: Artificial Sequence
<220> FEATURE:
<223> OTHER INFORMATION: Synthetic Construct

<400> SEQUENCE: 14
gcagttgccg attacaggta                                       20

<210> SEQ ID NO 15
<211> LENGTH: 19
<212> TYPE: DNA
<213> ORGANISM: Artificial Sequence
<220> FEATURE:
<223> OTHER INFORMATION: Synthetic Construct

<400> SEQUENCE: 15
cagttgccga ttacaggta                                        19

```
<210> SEQ ID NO 16
<211> LENGTH: 20
<212> TYPE: DNA
<213> ORGANISM: Artificial Sequence
<220> FEATURE:
<223> OTHER INFORMATION: Synthetic Construct

<400> SEQUENCE: 16
gtggaaggcg cttttcaccg                                              20

<210> SEQ ID NO 17
<211> LENGTH: 20
<212> TYPE: DNA
<213> ORGANISM: Artificial Sequence
<220> FEATURE:
<223> OTHER INFORMATION: Synthetic Construct

<400> SEQUENCE: 17
agagtctctc agctggtaca                                              20
```